(12) United States Patent
Sato et al.

(10) Patent No.: US 7,205,621 B2
(45) Date of Patent: Apr. 17, 2007

(54) SURFACE SHAPE RECOGNITION SENSOR

(75) Inventors: Norio Sato, Kanagawa (JP); Katsuyuki Machida, Kanagawa (JP); Satoshi Shigematsu, Kanagawa (JP); Hiroki Morimura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 255 days.

(21) Appl. No.: 10/512,757

(22) PCT Filed: Feb. 13, 2004

(86) PCT No.: PCT/JP2004/001532

§ 371 (c)(1),
(2), (4) Date: Oct. 26, 2004

(87) PCT Pub. No.: WO2004/072576

PCT Pub. Date: Aug. 26, 2004

(65) Prior Publication Data
US 2006/0057756 A1 Mar. 16, 2006

(30) Foreign Application Priority Data
Feb. 17, 2003 (JP) ............................ 2003-038915

(51) Int. Cl.
H01L 27/14 (2006.01)
H01L 29/84 (2006.01)

(52) U.S. Cl. ...................................... 257/415; 257/414

(58) Field of Classification Search ...................... None
See application file for complete search history.

(56) References Cited

U.S. PATENT DOCUMENTS 6,060,756 A * 5/2000 Machida et al. ............ 257/415

2002/0191820 A1 12/2002 Kim et al.
2003/0094663 A1 * 5/2003 Sato et al. .................. 257/414

FOREIGN PATENT DOCUMENTS

| JP | 05-288619 A | 11/1993 |
|---|---|---|
| JP | 2000-199701 A | 7/2000 |
| JP | 2002-328003 A | 11/2002 |
| JP | 2003-035507 A | 2/2003 |

OTHER PUBLICATIONS

Shimizu et al., "A Study on the Structure of a Smart Card with the Function to Verify the Holder", Technical report of IEICE OFS92-32, pp. 25-30 (1992).
Tartagni et al., "A 390dpi Live Fingerprint Imager Based on Feedback Capacitive Sensing Scheme", 1997 IEEE International Solid-State Circuits Conference, pp. 200-201 (1997).
Rey et al., "A High Density Capacitive Pressure Sensor Array For Fingerprint Sensor Application", IEEE International Conference on Solid-State Sensors and Actuators, pp. 1453-1456 (1997).
Sato et al., "MEMS Fingerprint Sensor with Arrrayed Cavity Structures", IEEE 2001.

* cited by examiner

Primary Examiner—Zandra V. Smith
Assistant Examiner—Kiesha Rose
(74) Attorney, Agent, or Firm—Blakely Sokoloff Taylor & Zafman

(57) ABSTRACT

A structure (113b) which includes an overhang and a support portion supporting substantially the center of the overhang, and in which the area of the support portion is smaller than the area of the overhang in the two-dimensional direction of an upper electrode (110b) is formed on the upper electrode (110a) in a region above each lower electrode 105a in one-to-one correspondence with the lower electrode (105a). An object of surface shape sensing, e.g., the tip of a finger (1602) touches the surface of the overhang of the structure (113b), and the support portion of the structure (113b) whose overhang is in contact with the object of sensing pushes down a portion of the upper electrode (110a) toward the lower electrode (105a), thereby deforming the upper electrode (110a).

4 Claims, 19 Drawing Sheets

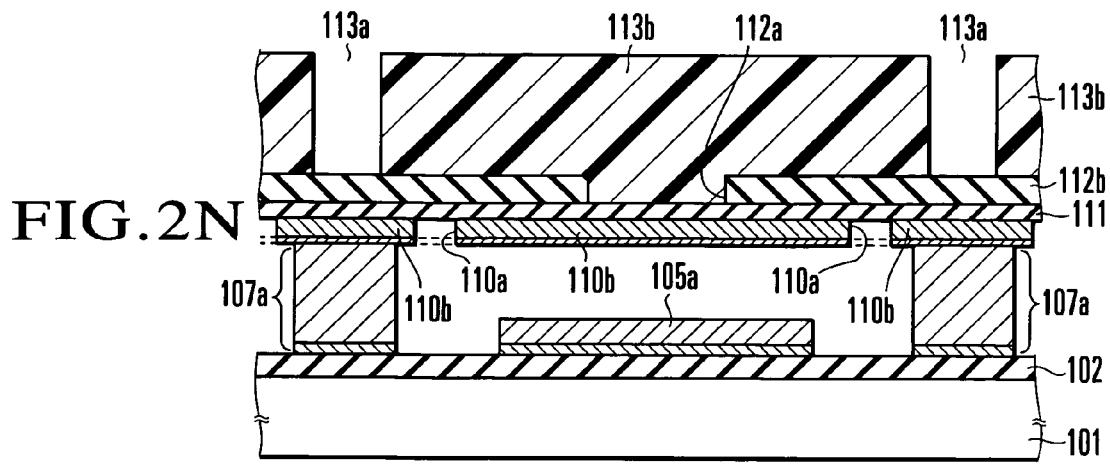
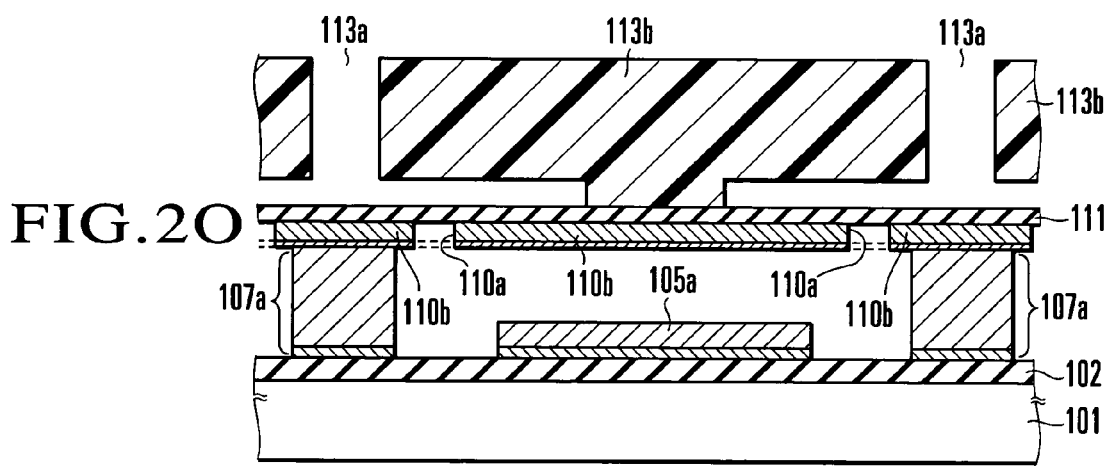
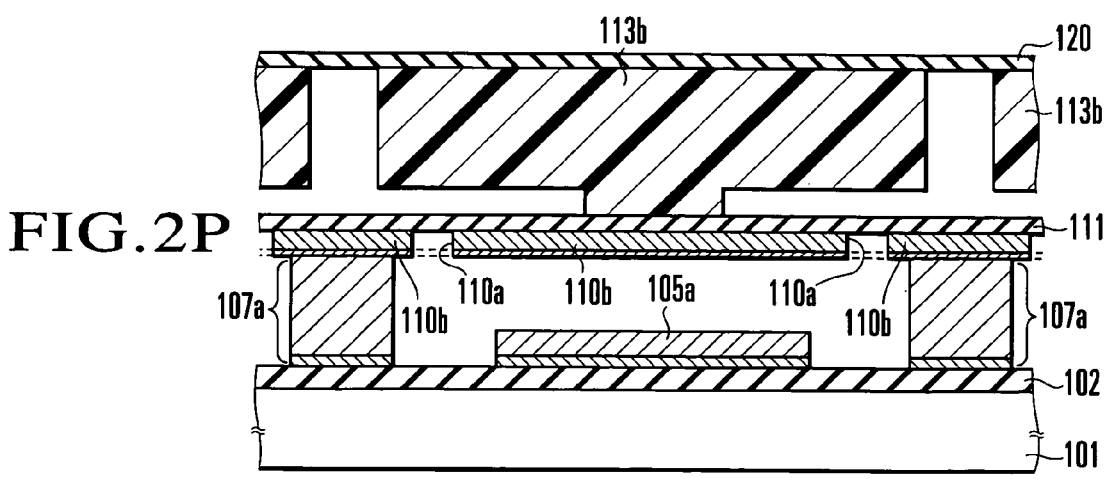

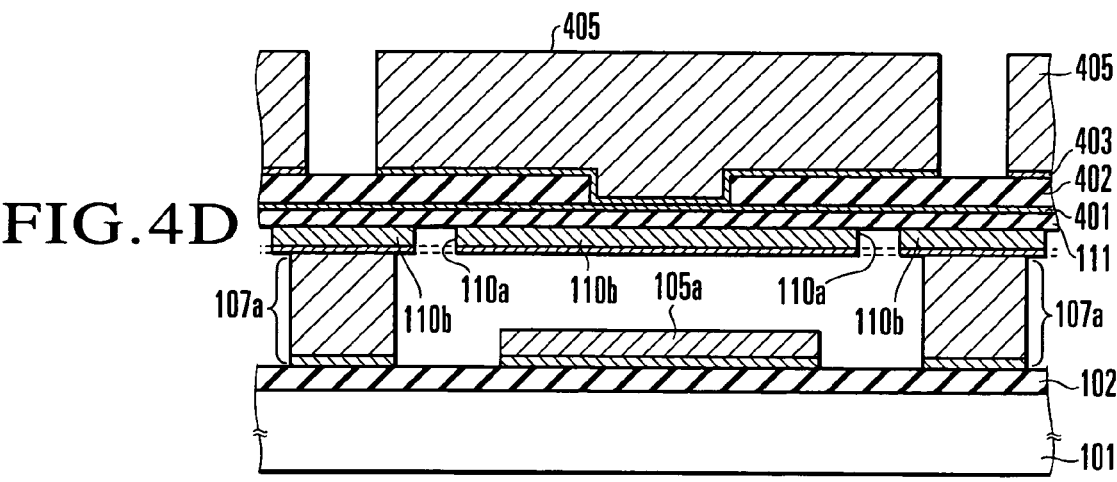
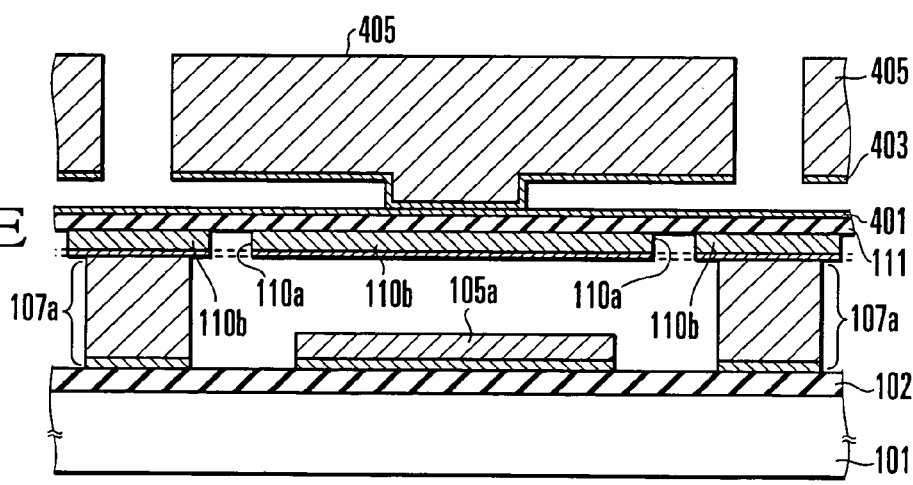
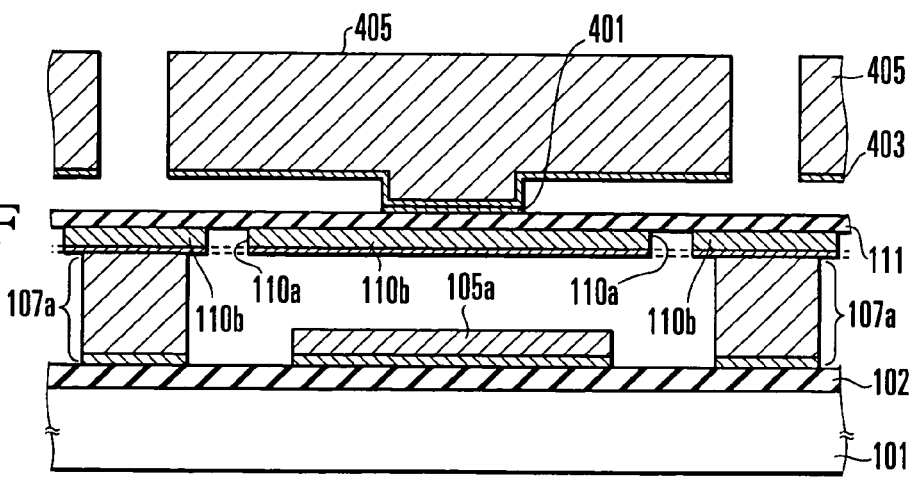

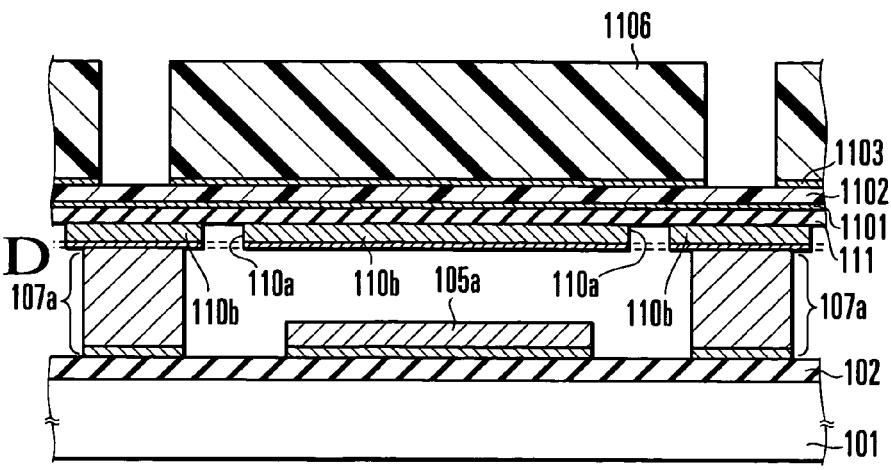
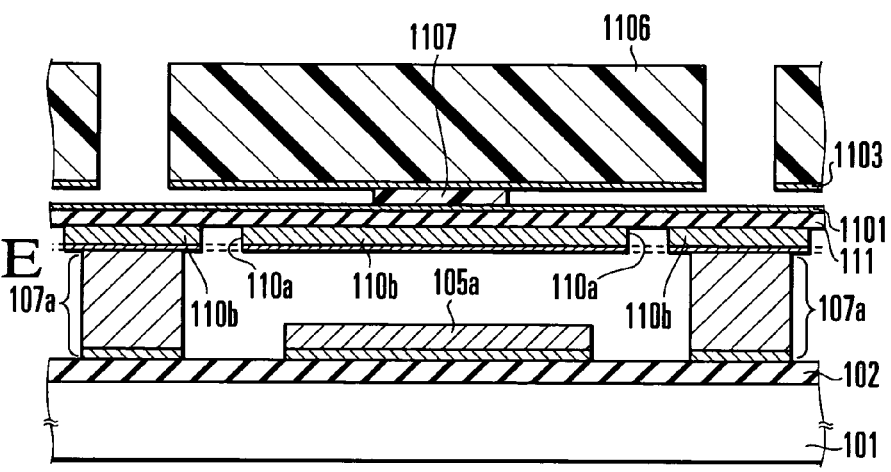
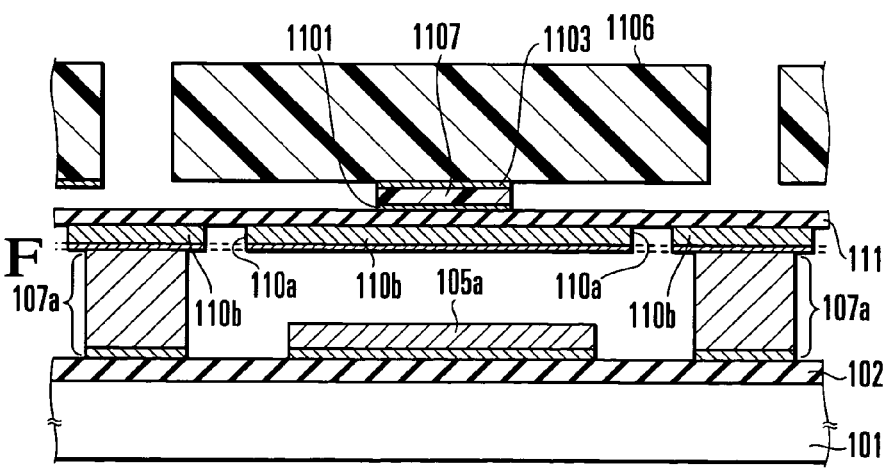

– 1 –

SURFACE SHAPE RECOGNITION SENSOR

The present patent application is a non-provisional application of International Application No. PCT/JP2004/001532, filed Feb. 13, 2004.

TECHNICAL FIELD

The present invention relates to a surface shape recognition sensor used to sense a surface shape having a fine three-dimensional pattern such as a human fingerprint or animal noseprint, and a method of fabricating the same.

BACKGROUND ART

Along with the advance of the information-oriented society and in the environment of the modern society, the security technology has received a great deal of attention. For example, in the information-oriented society, a personal authentication technology for constructing a system for, e.g., electronic cashing is an important key. Authentication technologies for preventing theft or unauthorized use of credit cards have also been extensively researched and developed. (Reference 1: Yoshimasa Shimizu et al., "A Study on the Structure of a Smart Card with the Function to Verify the Holder", Technical report of IEICE OFS92-32, pp. 25–30 (1992))

There are various kinds of authentication schemes such as fingerprint authentication and voice authentication. In particular, many fingerprint authentication techniques have been developed so far. Fingerprint reading schemes include an optical scheme which includes an optical system such as a lens and illumination, a pressure scheme using a pressure sheet, and a semiconductor scheme by which a sensor is formed on a semiconductor substrate. Of these schemes, the semiconductor scheme allows easy miniaturization and generalization. An example of the semiconductor sensor is a capacitive fingerprint sensor using the LSI fabrication technique. (Reference 2: Marco Tartagni and Robert Guerrieri, "A 390 dpi Live Fingerprint Imager Based of Feedback Capacitive Sensing Scheme", 1997 IEEE International Solid-State Circuits Conference, pp. 200–201 (1997)) This fingerprint sensor senses the three-dimensional pattern of a skin by using the feedback capacitive scheme by a sensor chip in which small capacitive sensors are two-dimensionally arranged on an LSI.

This capacitive sensor will be described below with reference to a sectional view in FIG. 14. The sensor includes a sensor electrode 1403 formed on a semiconductor substrate 1401 via an interlevel dielectric 1402, and a passivation film 1404 which covers the sensor electrode 1403. Although not shown in FIG. 14, on the semiconductor substrate 1401 below the interlevel dielectric 1402, a sensing circuit which is an integrated circuit including a plurality of MOS transistors and an interconnecting structure is formed. When a finger as an object of fingerprint sensing touches the passivation film 1404 (sensing surface) of the sensor chip having the above arrangement, the sensor electrode 1403 and the skin of the finger function as electrodes to form a capacitance.

This capacitance is sensed by the sensing circuit described above via an interconnection (not shown) connected to the sensor electrode 1403. However, since the capacitive fingerprint sensor uses the skin as an electrode, the built-in integrated circuit of the sensor chip is electrostatically destroyed by the static electricity generated at the fingertip.

To prevent this electrostatic destruction of the capacitive fingerprint sensor described above, a surface shape recognition sensor including a capacitive sensor having a sectional structure as shown in FIG. 15 is proposed. The arrangement of the sensor shown in FIG. 15 will be explained below. This sensor includes a sensor electrode 1503 formed on a semiconductor substrate 1501 via an interlevel dielectric 1502, a deformable plate-shaped moving electrode 1504 positioned at a predetermined distance from the sensor electrode 1503, and a support member 1505 which is formed around the sensor electrode 1503 so as to be insulated and separated from the sensor electrode 1503, and supports the moving electrode 1504.

When a finger as an object of fingerprint sensing touches the moving electrode 1504, the pressure from the finger deflects the moving electrode 1504 toward the sensor electrode 1503, thereby increasing the capacitance formed between the sensor electrode 1503 and moving electrode 1504. This capacitance is sensed by a sensing circuit on the semiconductor substrate 1501 via an interconnection (not shown) connected to the sensor electrode 1503. In this surface shape recognition sensor, when the moving electrode 1504 is grounded via the support member 1505, the static electricity generated at the fingertip flows to ground via the support member 1505 even if the electricity is discharged to the moving electrode 1504. This protects the built-in sensing circuit incorporated below the sensor electrode 1503 from the electrostatic destruction.

In addition to the surface shape recognition sensor shown in FIG. 15, a structure having a cubic projection 1601 as shown in FIG. 16 is also proposed. (Reference 3: Japanese Patent Laid-Open No. 2002-328003) In this structure, a force from a finger 1602 can be transmitted to the moving electrode 1504 more efficiently than in the structure shown in FIG. 15.

Unfortunately, the above conventional fingerprint sensors have the problem that no desired high sensitivity can be obtained. For example, in the fingerprint sensor having the arrangement shown in FIG. 14, the sensitivity largely changes in accordance with the state of the finger surface, so it is not easy to stably obtain high sensitivity. Also, in the fingerprint sensor having the arrangement shown in FIG. 15, no large change in upper electrode can be obtained, and this makes it impossible to obtain high sensitivity.

Furthermore, in the structure shown in FIG. 16, the projection 1601 is readily damaged by a force applied sideways to the moving electrode 1504, e.g., a force produced by scratching, and this lowers the mechanical strength. In addition, in the structure shown in FIG. 16, the projection 1601 sinks into the finger 1602 if it is soft, and the force disperses in a region on the support member 1505 of the moving electrode 1504, thereby lowering the sensitivity.

DISCLOSURE OF INVENTION

The present invention has been made to solve the above problems, and has as its object to provide a surface shape recognition sensor which senses a shape such as a fingerprint at high sensitivity, and has high mechanical strength.

A surface shape recognition sensor according to the present invention comprises a plurality of capacitance sensing elements comprising a plurality of lower electrodes arranged in the same plane on a substrate so as to be insulated and separated from each other, and a deformable plate-shaped upper electrode formed above the lower electrodes with a predetermined spacing between them, and made of a metal, a support member which is formed around the lower electrode so as to be insulated and separated from the lower electrode, and supports the upper electrode, and a structure formed on the upper electrode in a region above each of the lower electrodes in one-to-one correspondence with the lower electrode, wherein the structure comprises an overhang and a support portion which supports substantially a center of the overhang, and an area of the support portion is smaller than an area of the overhang in a two-dimensional direction of the upper electrode.

In the surface shape recognition sensor having the above arrangement, an object of surface shape sensing, e.g., a fingertip touches the surface of the overhang of the structure, and the support of the structure whose overhang is in contact with the object of sensing pushes down a portion of the upper electrode toward the lower electrode, thereby deforming the upper electrode.

The above surface shape recognition sensor may also comprise a thin flexible film formed on the overhang of the structure, and extending over a plurality of the structures, thereby inhibiting an invasion of an object from the gap between adjacent structures. The sensor may also comprise a perimeter support portion formed below a perimeter of the overhang, and made of an elastic material, thereby preventing a fall of the structure.

In the above surface shape recognition sensor, the substrate may be a semiconductor substrate on which an integrated circuit is formed, the lower electrode may be placed on a interlevel dielectric formed on the semiconductor substrate, and the integrated circuit may include a sensing circuit which senses a capacitance formed on the lower electrode.

A surface shape recognition sensor fabrication method according to the present invention comprises the steps of forming an interlevel dielectric on a semiconductor substrate, forming a first metal film on the interlevel dielectric, forming a first mask pattern having a first opening portion on the first metal film, forming a first metal pattern by plating on a surface of the first metal film exposed to a bottom of the first opening portion in the first mask pattern, removing the first mask pattern, and forming, on the first metal film and first metal pattern, a second mask pattern having a second opening portion around the first metal pattern, forming a second metal pattern thicker than the first metal pattern by plating on the surface of the first metal pattern exposed to a bottom of the second opening portion in the second mask pattern, removing the second mask pattern, and etching away the first metal film by using the first metal pattern and second metal pattern as masks, thereby forming a lower electrode made of the first metal film and first metal pattern, and a support member made of the first metal film and second metal pattern, forming a first sacrificial film on the interlevel dielectric so as to cover the lower electrode and expose an upper portion of the support member, forming an upper electrode having a plurality of third opening portions on the first sacrificial film and support member, selectively removing the first sacrificial film via the third opening portions after the upper electrode is formed, forming a sealing film on the upper electrode after the first sacrificial film is removed, forming, on the sealing film, a second sacrificial film having a fourth opening portion smaller than an area of a region surrounded by the support member in a region above the lower electrode, forming, on the second sacrificial film, a layer thicker than a depth of the fourth opening portion so as to fill the fourth opening portion, forming a trench in a region, positioned on the support member, of the thick layer, and forming a structure on the sealing film in the region above each of the lower electrodes in one-to-one correspondence with the lower electrode, and removing the second sacrificial film via the trench between adjacent structures, wherein a plurality of capacitance sensing elements comprising the lower electrode and upper electrode are formed.

In this fabrication method, a structure which includes an overhang and a support portion supporting substantially the center of the overhang, and in which the area of the support portion is smaller than the area of the overhang in the two-dimensional direction of the upper electrode is formed on the upper electrode in the region above each lower electrode.

In the above surface shape recognition sensor fabrication method, the first sacrificial film may be formed by hot-pressing, on the semiconductor substrate, a dielectric material preformed on a base by coating to bury the dielectric material in the support member and lower electrode, and peeling the base from the dielectric material, thereby forming a thin film having a flat surface on the semiconductor substrate, and exposing the support member by etching back the thin film.

In the above surface shape recognition sensor fabrication method, the structure may be formed by forming a thin film by coating a bottom of the fourth opening portion and an upper surface of the second sacrificial film with a photosensitive resin, forming the trench by removing a portion of the thin film by exposure and development by using a trench-shaped pattern, and thermally curing the thin film.

In the above surface shape recognition sensor fabrication method, the step of forming the structure may comprise the steps of forming a second metal film on a bottom of the fourth opening portion and on the second sacrificial film, forming a third mask pattern having an opening portion on the second metal film, forming a third metal pattern by plating on a surface of the second film exposed to a bottom of the third mask pattern, removing the third mask pattern to obtain a portion of the trench, forming the trench by etching away the second metal film exposed to a bottom of the portion of the trench by using the third metal pattern as a mask, and etching away the second sacrificial film via the trench.

The above surface shape recognition sensor fabrication method may further comprise the steps of forming an etching stop film made of a metal on the sealing film, and forming the second sacrificial film on the etching stop film by using a photosensitive material.

Another surface shape recognition sensor fabrication method according to the present invention comprises the steps of forming an interlevel dielectric on a semiconductor substrate, forming a first metal film on the interlevel dielectric, forming a first metal pattern by plating on a surface of the first metal film exposed to a bottom of a first opening portion in the first mask pattern, removing the first mask pattern, and forming, on the first metal film and first metal pattern, a second mask pattern having a second opening portion around the first metal pattern, forming a second metal pattern thicker than the first metal pattern by plating on the surface of the first metal pattern exposed to a bottom of the second opening portion in the second mask pattern, removing the second mask pattern, and etching away the first metal film by using the first metal pattern and second metal pattern as masks, thereby forming a lower electrode made of the first metal film and first metal pattern, and a support member made of the first metal film and second metal pattern, forming a first sacrificial film on the interlevel dielectric so as to cover the lower electrode and expose an upper portion of the support member, forming an upper electrode having a plurality of third opening portions on the first sacrificial film and support member, selectively removing the first sacrificial film via the third opening portions after the upper electrode is formed, forming a sealing film on the upper electrode after the first sacrificial film is removed, forming a columnar pattern in a predetermined region on the upper electrode, laminating, on the columnar pattern, a photosensitive resin film separated from the sealing film, and forming a structure made up of the columnar pattern and thin film by removing a portion of the thin film into a shape of a lattice, wherein a plurality of capacitance sensing elements comprising the lower electrode and upper electrode are formed.

The above surface shape recognition sensor fabrication method may further comprise the step of adhering a thin rubber film on the structure. The method can may further comprise the step of placing a thin film on the structure, and fixing the thin film at an end of a region in which the plurality of capacitance sensing elements are formed.

BRIEF DESCRIPTION OF DRAWINGS

FIGS. 4A to 4F are views of steps for explaining another example of the method of fabricating the surface shape recognition sensor according to the embodiment of the present invention;

FIGS. 11A to 11F are views of steps for explaining another example of the method of fabricating the surface shape recognition sensor according to the embodiment of the present invention;

BEST MODE FOR CARRYING OUT THE INVENTION

Embodiments of the present invention will be described below with reference to the accompanying drawings.

First Embodiment

Figure 1A:
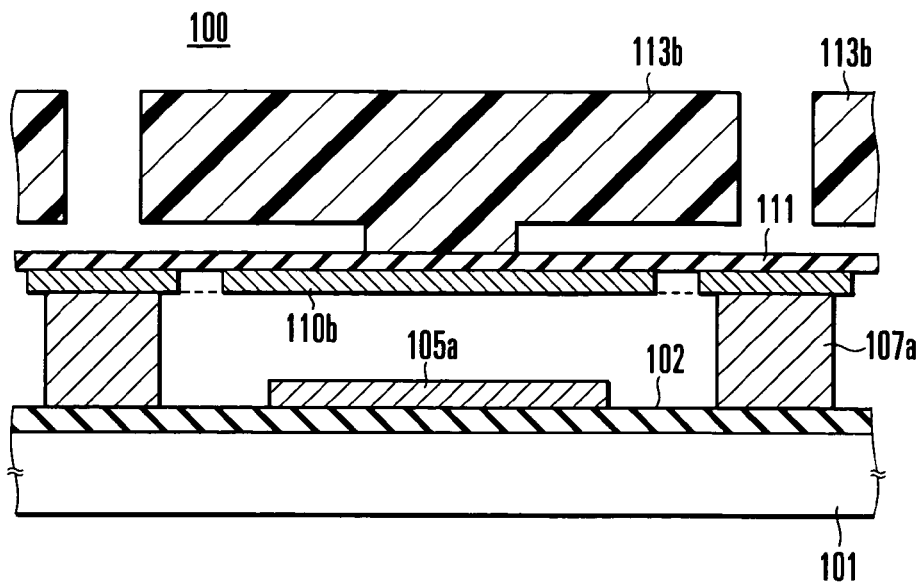
FIG. 1A is a schematic sectional view showing an example of the arrangement of a surface shape recognition sensor according to an embodiment of the present invention.
Figure 1B:
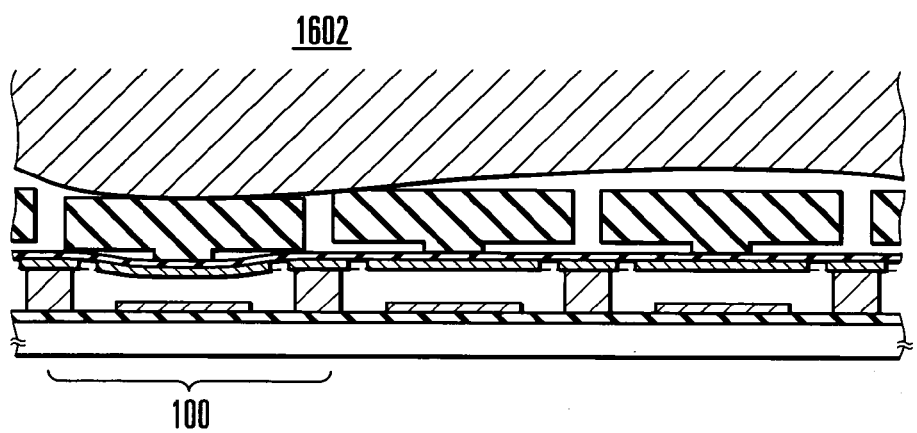
FIG. 1B is a schematic sectional view showing the example of the arrangement of the surface shape recognition sensor according to the embodiment of the present invention.
Figure 1C:
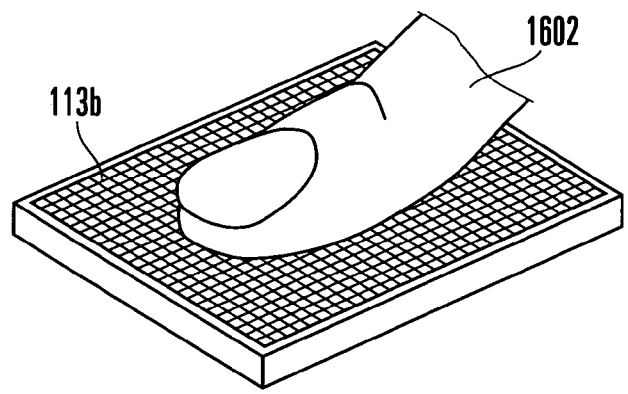
FIG. 1C is a perspective view showing the whole structure of the surface shape recognition sensor.

First, a surface shape recognition sensor according to the first embodiment of the present invention will be described below with reference to FIGS. 1A, 1B, and 1C. FIGS. 1A and 1B are schematic sectional views showing an example of the arrangement of this sensor, in which FIG. 1A mainly illustrates a sensor element (sensor cell) 100 as a constituent unit of the surface shape recognition sensor. For example, a plurality of sensor elements 100 are arranged in a matrix to form the sensing surface of this sensor. FIG. 1B shows the state in which a fingertip as an object of surface shape sensing is in contact with the sensing surface of this sensor. Also, FIG. 1C is a perspective view showing the whole structure of the surface shape recognition sensor.

The arrangement of the sensor element 100 will be explained in detail below. On a substrate 101 made of single-crystal silicon or the like, a lower electrode 105a is formed via an interlevel dielectric 102. The lower electrode 105a is positioned in substantially the center of the region of the sensor element 100. A support member 107a is formed around the lower electrode 105a, and an upper electrode 110b is supported on the support member 107a.

The support member 107a is, e.g., a lattice-shape member, and the lower electrode 105a is formed in the center of each square of the lattice. Accordingly, each square of the lattice-shape support member 107a is the region of one sensor element 100. The upper electrode 110b is integrally formed on the support member 107a, so one upper electrode 110b is formed for a plurality of lower electrodes 105a. Also, the upper electrode 110b is flexible, and a portion opposing the lower electrode 105a is elastically deformable so as to deflect toward the lower electrode 105a.

The upper electrode 110b has a structure 113b formed on it via a sealing film 111. The structure 113b is made up of a support portion which is in direct contact with the upper portion of the structure 113b, and an overhang which extends outward from this support portion. The structures 113b adjacent to each other are separated from each other, and, for example, each structure 113b is paired with the lower electrode 105a. As is also shown in FIG. 1B, the structure 113b is formed in each sensor element 100.

The overhang of the structure 113b is formed so as not to exceed the region of the sensor element 100 in the direction in which the upper electrode 110b runs. By contrast, the support portion of the structure 113b is made as small as possible so as to be able to support the overhang.

The overhang of the structure 113b need only have a substantially square planar shape. For example, when the sensor elements 100 are arranged at an interval of 50 µm, it is only necessary to form the overhang of the structure 113b as a square of 45 µm side, and form the support portion in contact with the sealing film 111 as a square of 5 µm side.

In this surface shape recognition sensor, as shown in FIG. 1B, the upper electrode 110b below the structure 113b which is pushed down when touched by a finger 1602 deflects downward, and this changes the capacitance formed by the upper electrode 110b and lower electrode 105a. In this state, a downward pushing force is applied to the overhang having a large area of the structure 113b, and this force is transmitted to the upper electrode 110b via the support portion having a small area of the structure 113b. Accordingly, a force applied per unit area increases in the upper electrode 110b.

In this embodiment as described above, the force applied to substantially the entire area of the sensor element 100 when the finger 1602 touches is concentrated to the support portion of the structure 113b and transmitted to the upper electrode 110b. In this embodiment, therefore, the sensitivity of the surface shape recognition sensor can be increased. Also, in this embodiment, the spacing between the adjacent structures 113b is narrow, so it is possible to prevent the structure 113b from sinking into the finger 1602 to disperse the force.

The operation of the this surface shape recognition sensor will be briefly explained below. When a finger touches the sensing surface on which the plurality of structures 113b are arranged, and pushes one structure 113b downward, the upper electrode 110b of the sensor element 100 below the structure 113b that is pushed down deflects downward. This deflection changes the capacitance formed between the upper electrode 110b and lower electrode. The shape of the fingerprint can be regenerated by forming continuous tone data in accordance with those changes in capacitances formed on the lower electrodes 105a, which correspond to the fingerprint shape.

Note that the sensing of the capacitance in each sensor cell when the upper electrode 110b deforms and the conversion into the continuous tone data are performed by, e.g., an integrated circuit (not shown) formed on the substrate 101. Note also that when, for example, the upper electrode 110b is grounded, static electricity generated in an object flows to ground even if this static electricity is discharged to the upper electrode 110b. By thus connecting the upper electrode 110b to ground, the integrated circuit can be protected from electrostatic destruction.

Figure 2A:
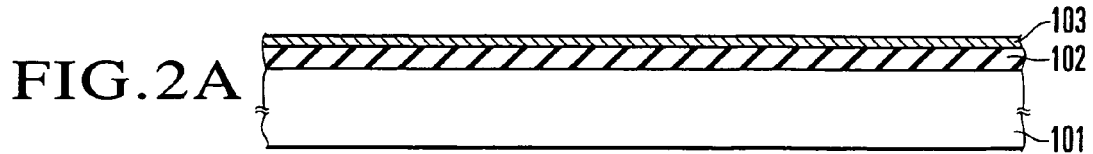
FIGS. 2A to 2P are views of steps for explaining an example of a method of fabricating the surface shape recognition sensor according to the embodiment of the present invention.

A method of fabricating the surface shape recognition sensor according to this embodiment described above will be explained below. First, as shown in FIG. 2A, an interlevel dielectric 102 made of silicon nitride or the like is formed on a substrate 101 made of a semiconductor material such as silicon. Although not shown, an integrated circuit such as a sensing circuit and an interconnecting structure having a plurality of interconnections are formed on the substrate 101 below the interlevel dielectric 102. After the interlevel dielectric 102 is formed, a seed layer (first metal film) 103 which is a two-layered film made up of a 0.1-µm thick titanium film and 0.1-µm thick gold film is formed by vapor deposition or the like. Note that the interlevel dielectric 102 may also be made of silicon oxide, but it is preferably made of silicon nitride when an HF-based etching process (to be described later) is taken into consideration.

Figure 2B:
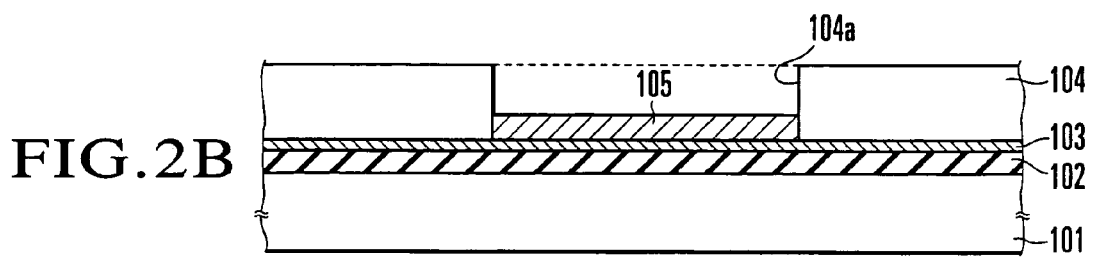

Subsequently, as shown in FIG. 2B, a resist pattern (first mask pattern) 104 about 5 µm thick having an opening portion 104a is formed on the seed layer 103. The resist pattern 104 is formed by the well-known photolithography technique. When the resist pattern 104 is formed, a metal pattern (first metal pattern) 105 about 1 µm thick made of a gold plating film is formed by electroplating on the seed layer 103 exposed to the opening portion 104a. Since the film is formed by electroplating, the gold plating film is not formed on the resist pattern 104, and the metal pattern 105 is selectively formed on the seed layer 103 exposed to the opening portion 104a.

Figure 2C:
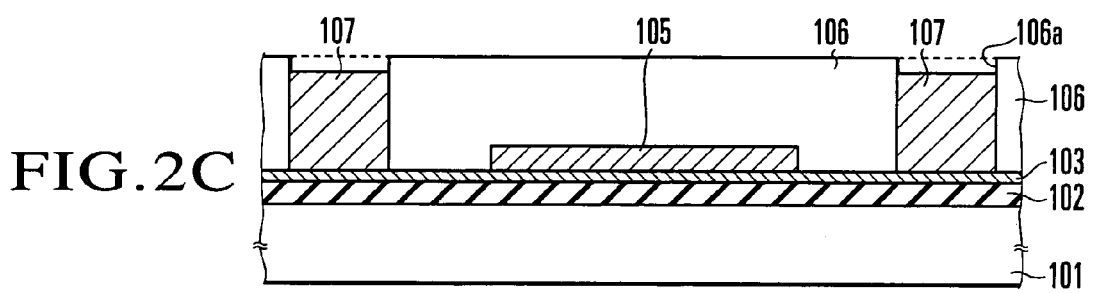

After the resist pattern 104 is removed, as shown in FIG. 2C, a 5-µm thick resist pattern (second mask pattern) 106 having an opening portion 106a is formed. The resist pattern 106 is formed so that it covers the metal pattern 105 and the opening portion 106a is positioned in a prospective region of the support member 107a shown in FIG. 1. After the resist pattern 106 is formed, a metal pattern (second metal pattern) 107 about 3 µm thick made of a gold plating film is formed by electroplating on the seed layer 103 exposed to the opening portion 106a.

After the resist pattern 106 is removed, the metal patterns 105 and 107 are used as masks to selectively etch the seed layer 103. In this etching, an etchant containing iodine, ammonium iodide, water, and ethanol is first used to selectively remove the gold as the upper layer of the seed layer 103. Then, an HF-based etchant is used to selectively remove the titanium as the lower layer of the seed layer 103. Note that the etching rate in the gold wet etching is 0.05 µm/min.

Figure 2D:
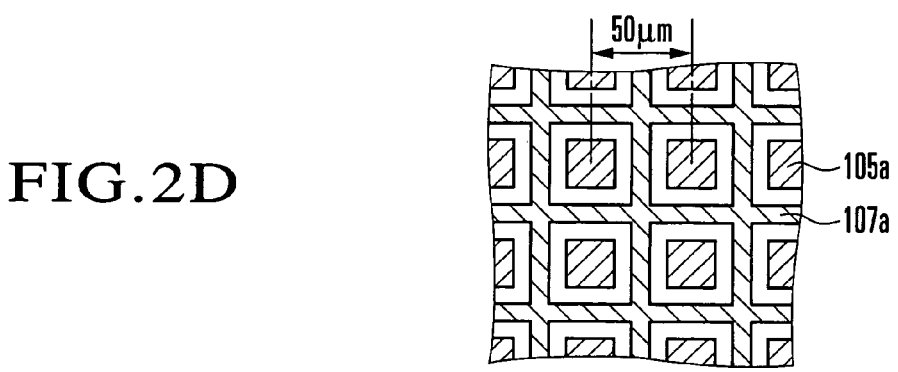
Figure 2E:
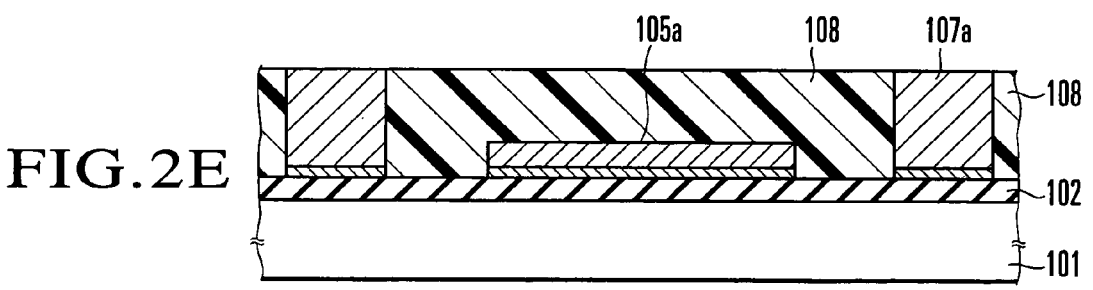

Consequently, as shown in FIG. 2E, a lower electrode 105a having the gold upper layer and a support member 107a insulated and separated from the lower electrode 105a are formed on the substrate 101. As shown in FIG. 1, the support member 107a supports the upper electrode 110b. Also, as shown in the plan view of FIG. 2D, the support member 107a is formed into the shape of a lattice on the substrate 101. A plurality of lower electrodes 105a are arranged in the centers of regions surrounded by the lattice-shaped support member 107a.

When the lower electrode 105a and support member 107a are formed as described above, as shown in FIG. 2E, a sacrificial film 108 (first sacrificial film) is so formed as to cover the lower electrode 105a and expose the upper surface of the support member 107a. The formation of the sacrificial film 108 will be briefly explained below. First, a photosensitive resin film is formed on the substrate 101 by spin coating, thereby covering the lower electrode 105a and support member 107a. The resin film has positive photosensitivity, and is formed by, e.g., adding a positive photosensitive agent to a base resin (polyimide) such as polyamide, polyamide acid, or polybenzoxazole (or its precursor).

After a heating process (prebaking) is performed, the region above the support member 107a is exposed by using the well-known photolithography technique, and development is subsequently performed to expose the upper portion of the support member 107a. After that, the resin film is cured by a heating process and etched back by chemical mechanical polishing, thereby substantially leveling the support member 107a and sacrificial film 108 with each other as shown in FIG. 2E.

Figure 2F:
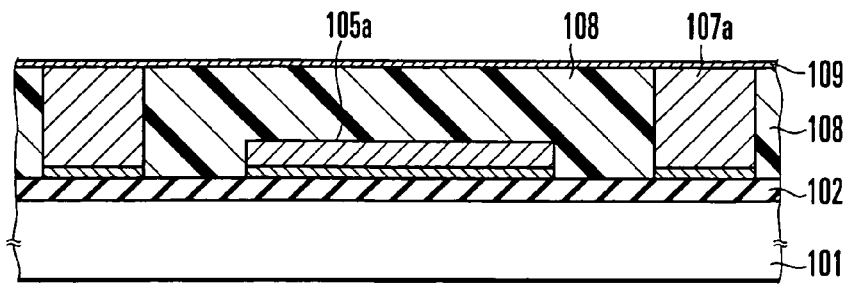

After the sacrificial film 108 is formed as described above, as shown in FIG. 2F, on the sacrificial film 108 in which the upper surface of the support member 107a is exposed by planarization, a seed layer 109 which is a two-layered film made up of a 0.1-μm thick titanium film and 0.1-μm thick gold film is formed by vapor deposition or the like.

Figure 2G:
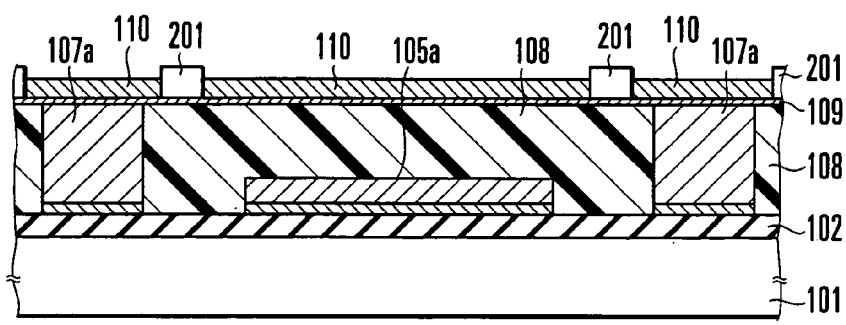

Then, as shown in FIG. 2G, a columnar resist pattern 201 is formed on the seed layer 109, and a metal film 110 about 1.0 μm thick made of a gold plating film is formed by electroplating on the exposed seed layer 109 in a region where the resist pattern 201 is not formed.

Figure 2H:
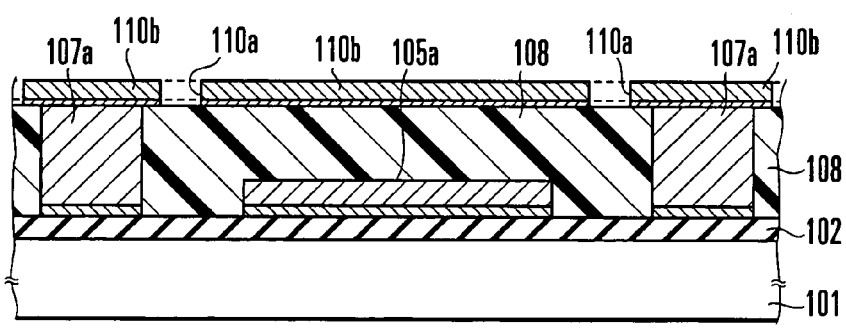

After the resist pattern 201 is removed, the formed metal film 110 is used as a mask to selectively etch away the seed layer 109. Consequently, as shown in FIG. 2H, an upper electrode 110b having a plurality of opening portions 110a is formed. The opening portions 110a have a square planar shape of 4 μm side, and are arranged at the four corners inside the support member 107a.

Figure 2I:
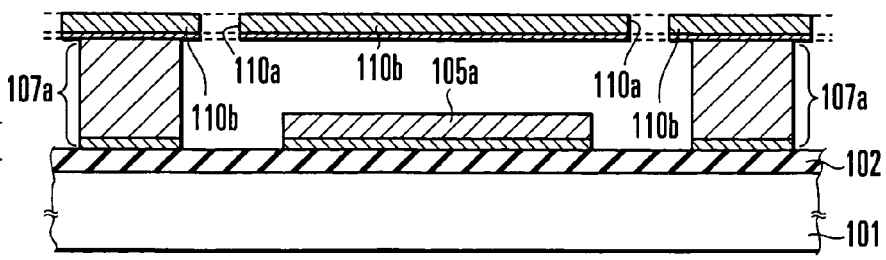

Subsequently, as shown in FIG. 2I, the sacrificial film 108 is removed via the opening portions 110a in the upper electrode 110b to form a space below the upper electrode 110b. With the formed space sandwiched between them, the upper surface of the lower electrode 105a opposes the lower surface of the upper electrode 110 at a predetermined distance. Note that the upper electrode 110b is supported by the support member 107a. Note also that the sacrificial film 108 is removed by exposing the substrate 101 to a plasma mainly containing oxygen gas, and bringing the etching species generated by the plasma into contact with the sacrificial film 108 via the opening portions 110a.

Figure 2J:
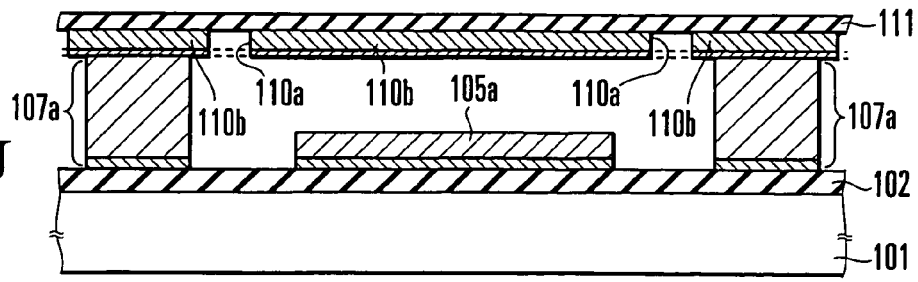

As shown in FIG. 2J, a sealing film 111 is laminated and adhered to the upper electrode 110b to close the opening portions 110a while the space between the upper electrode 110b and lower electrode 105a is held. The formation of the sealing film 111 by lamination was performed by using an STP technique (Spin-coating film Transfer and hot-Pressing technique). This technique will be briefly explained below. First, a resin film preformed on a sheet film by coating is hot-pressed on the upper electrode 110b in a vacuum. Then, the sheet film is peeled from the resin film, and the resin film laminated on the upper electrode 110b is cured by a heat treatment which holds the temperature at 300° C. for about 1 hr. As a consequence, the sealing film 111 made of the resin film is formed on the upper electrode 110b. The resin film is made of a base resin (polyimide) such as polyamide, polyamide acid, or polybenzoxazole (or its precursor).

Figure 2K:
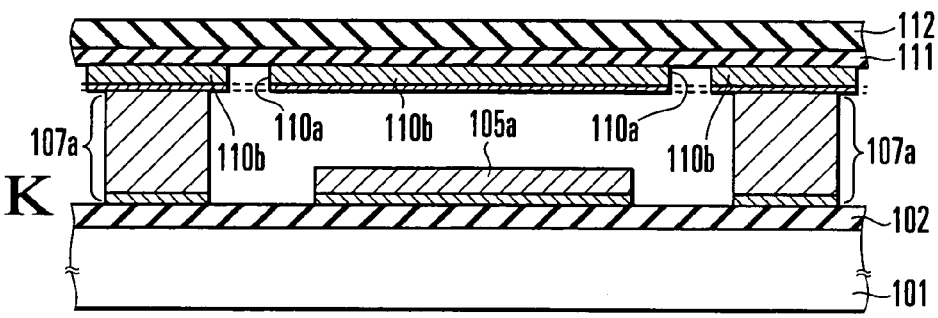
Figure 2L:
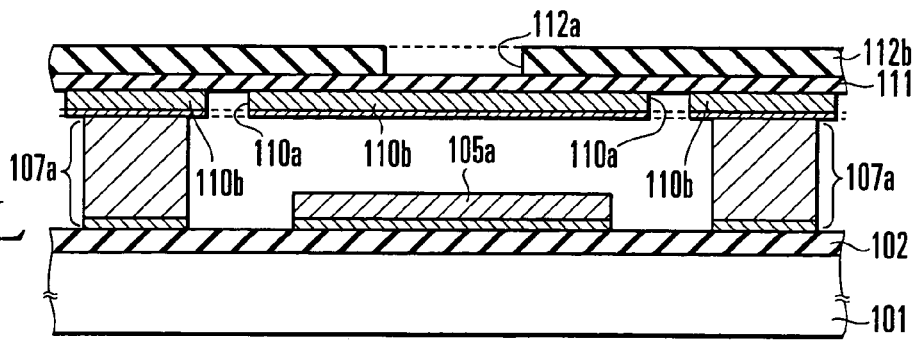

After the sealing film 111 is formed as described above, as shown in FIG. 2K, a silicon oxide film 112 about 1.5 μm thick is deposited on the sealing film 111 by sputtering. Then, a resist pattern about 3 μm thick having a square opening portion of about 5 μm side in substantially the center of the upper electrode 10b is formed by the well-know photolithography technique. The silicon oxide film 112 on the bottom of the opening portion in this resist pattern is etched away by ah HF-based etchant, and the resist pattern is removed after that. Consequently, as shown in FIG. 2L, a sacrificial film 112b (second sacrificial film) made of the silicon oxide film and having an opening portion 112a is formed.

As will be explained below, the opening portion 112a in the sacrificial film 112b is a mold for forming a support portion for supporting the structure 113b. Therefore, the opening portion 112a is formed to have an area smaller than at least the element region surrounded by the support member 107a, preferably, smaller than the lower electrode 105a. Also, the opening portion 112a is positioned in the region above substantially the center of the lower electrode 105a. The depth of the opening portion 112a is the height of the support portion of the structure 113b. Accordingly, the thickness of the sacrificial film 112b is appropriately set in accordance with the shape of the desired structure 113b.

Figure 2M:
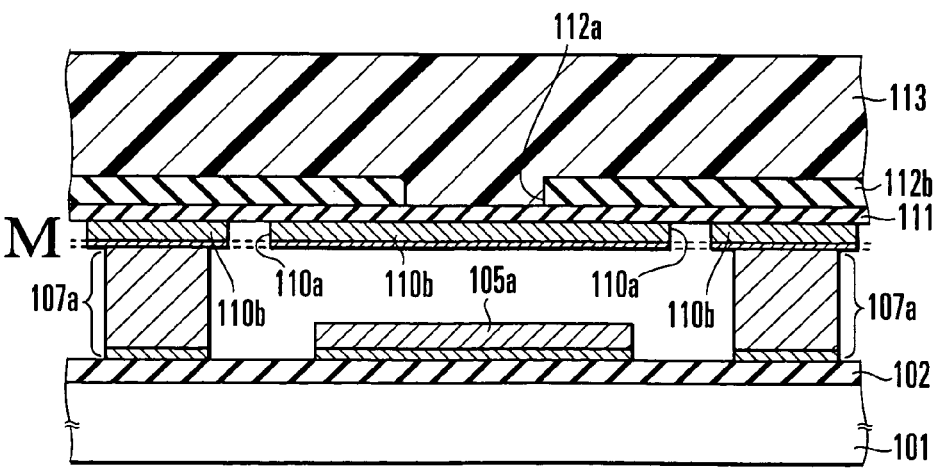

As shown in FIG. 2M, a photosensitive resin film 113 about 10 μm thick is formed by spin coating on the sacrificial film 112b and sealing film 111. The resin film has positive photosensitivity, and is formed by, e.g., adding a positive photosensitive agent to a base resin (polyimide) such as polyamide, polyamide acid, or polybenzoxazole (or its precursor).

After the resin film 113 is formed by coating and heated (prebaked), a region substantially corresponding to the upper portion of the support member 107a is exposed by the well-known photolithography technique. As shown in FIG. 2N, development is subsequently performed to form trenches 113a and a structure 113b. The width of the trench 113a is about 5 μm. After that, the structure 113b is cured by a heating process by which it is held at about 300° C. for 1 hr.

The sacrificial film 112b is then etched away by allowing an HF-based etchant to act from the trenches 113a. Consequently, as shown in FIG. 2O, the structure 113b is given a support portion which is in direct contact with the upper surface of the sealing film 111, and an overhang which extends outward from this support portion. The structure 113b has a T-shaped section, and the area of the uppermost portion is larger than the portion adhered to the sealing film 111. Also, the structures 113b are formed in one-to-one correspondence with the lower electrodes 105a, and the overhangs of adjacent structures 113b are separated by about 5 μm.

In this embodiment, the lower portion (support portion) of the structure 113b is narrower than its upper portion (overhang), and adhered to substantially the center of the upper electrode 110b. Also, the thickness of the upper electrode 110b positioned immediately below the adhered portion between the structure 113b and sealing film 111 apparently increases by the presence of the structure 113b, so the upper electrode 110b does not easily deflect. However, the upper electrode 110b around the adhered portion has the thickness of the upper electrode 110b and sealing film 111, and easily deflects.

The adhered portion between the structure 113b and sealing film 111 is positioned in the center of the upper electrode 110b, and the deflection of the upper electrode 110b is a maximum in this portion. Therefore, the structure 113b efficiently transmits a force received from a finger to the upper electrode 110b, and this makes it possible to increase the deflection of the upper electrode 110b.

Note that in the above embodiment a silicon oxide film is used as the second sacrificial film (sacrificial film 112b) and an HF-based etchant is used as the etchant for the film, but the present invention is not limited to this embodiment. It is also possible to from the second sacrificial film from titanium, and remove the film by an HF-based etchant. Alternatively, it is possible to form the second sacrificial film from a copper film obtained by plating, and remove the film by an etchant containing nitric acid or the like.

Furthermore, the sacrificial film 108 is formed by forming a photosensitive resin film by spin coating and forming a flat surface by etching back the film by chemical mechanical polishing, but it is also possible to form a flat surface by filling the support member 107a and lower electrode 105a with a photosensitive film by the STP technique without using any chemical mechanical polishing, and exposing the support member 107a by etching back as needed.

In addition to the above structure, as shown in FIG. 2P, a thin film 120 may also be formed on the structure 113b. As the thin film 120, a resin film about 2 µm thick, for example, can be adhered on the upper surface of the structure 113b by using the STP technique. It is also possible to adhere rubber about 10 µm thick on the upper surface of the structure 113b. This prevents a portion of an object from entering the trenches 113a around the structure 113b. Also, since the film is made of rubber, the structures 113b adjacent to each other do not completely interlock with each other, but can move independently of each other.

Alternatively, a film about 10 µm thick made of an organic material can be formed as the thin film 120, and fixed at the end portions of the sensing surface on which the plurality of structures 113b are arranged. In this structure, the trenches 113a are completely closed from the outside, and the film is not adhered to the upper surface of the structure 113b, so the structures 113b adjacent to each other can move independently of each other.

Second Embodiment

Another embodiment of the present invention will be described below.

First, following the same procedures as in FIGS. 2A to 2J, a lower electrode 105a, upper electrode 110b, and the like are formed, and the upper electrode 110b is covered with a sealing film 111.

Figure 3A:
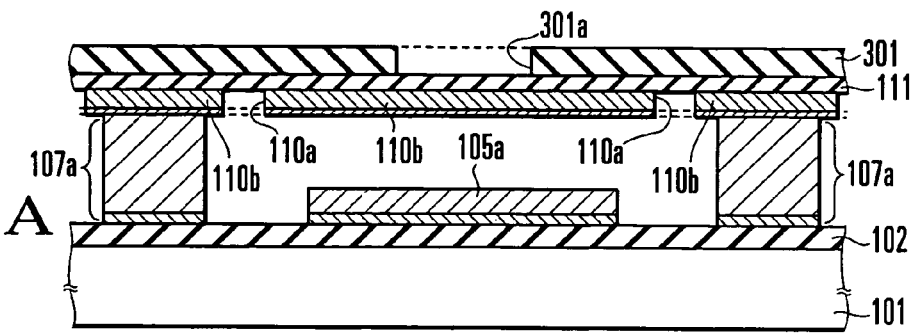
FIGS. 3A to 3E are views of steps for explaining another example of the method of fabricating the surface shape recognition sensor according to the embodiment of the present invention.

Subsequently, a silicon oxide film is formed on the sealing film 111 by sputtering or the like, and patterned by the well-know photolithography technique or the like, thereby forming a sacrificial film 301 (second sacrificial film) having an opening portion 301a as shown in FIG. 3A.

Figure 3B:
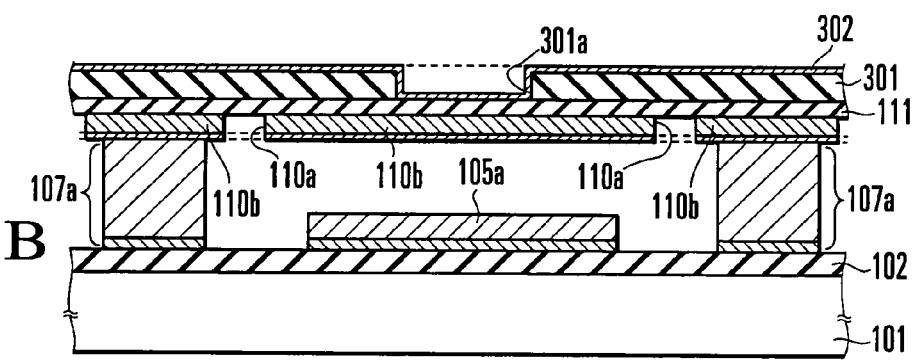
Figure 3C:
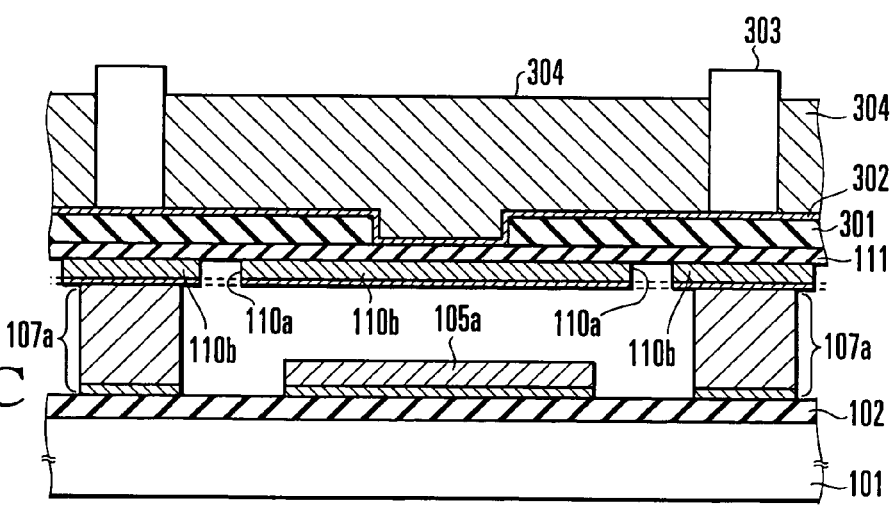

After the sacrificial film 301 is formed as described above, as shown in FIG. 3B, a seed layer (second metal film) 302 which is a two-layered film including a 0.1-µm thick chromium film and 0.1-µm thick gold film is formed by vapor deposition or the like. Then, as shown in FIG. 3C, a resist pattern 303 (third mask pattern) is formed. The resist pattern 303 is a lattice-shaped pattern, and formed in a region where a support member 107a is formed.

In addition, to fill the squares of the resist pattern 303 halfway, a metal pattern (third metal pattern) 304 about 10 µm thick is formed on the seed layer 302. The metal pattern 304 need only be selectively formed on the exposed seed layer 302 by electroplating.

Figure 3D:
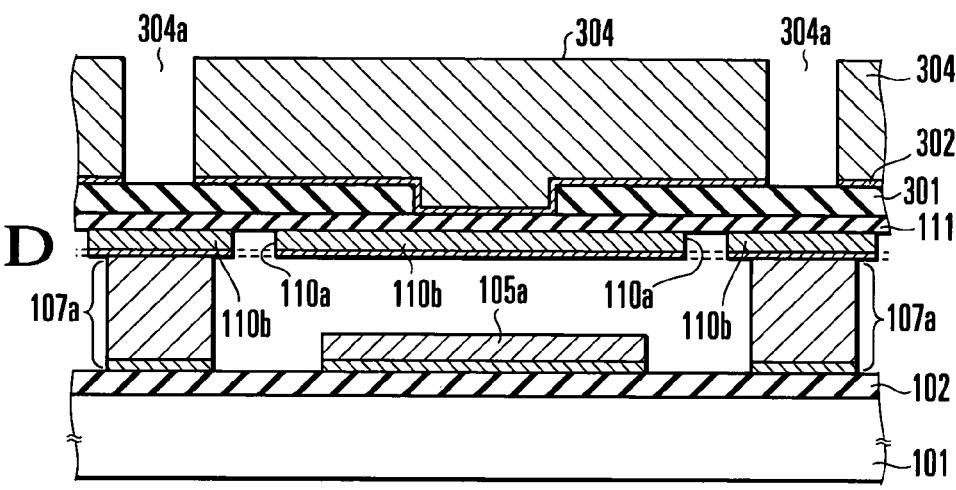

When the resist pattern 303 is removed after the metal pattern 304 is formed as described above, a metal pattern 304 having opening portions 304a is formed as shown in FIG. 3D.

After that, the metal pattern 304 is used as a mask to selectively etch the seed layer 302 exposed to the bottoms of the opening portions 304a. In this etching, an etchant containing iodine, ammonium iodide, water, and ethanol is first used to selectively remove the gold as the upper layer of the seed layer 302. Then, an etchant containing potassium ferricyanide and sodium hydroxide is used to selectively remove the chromium as the lower layer of the seed layer 302 (FIG. 3D).

Figure 3E:
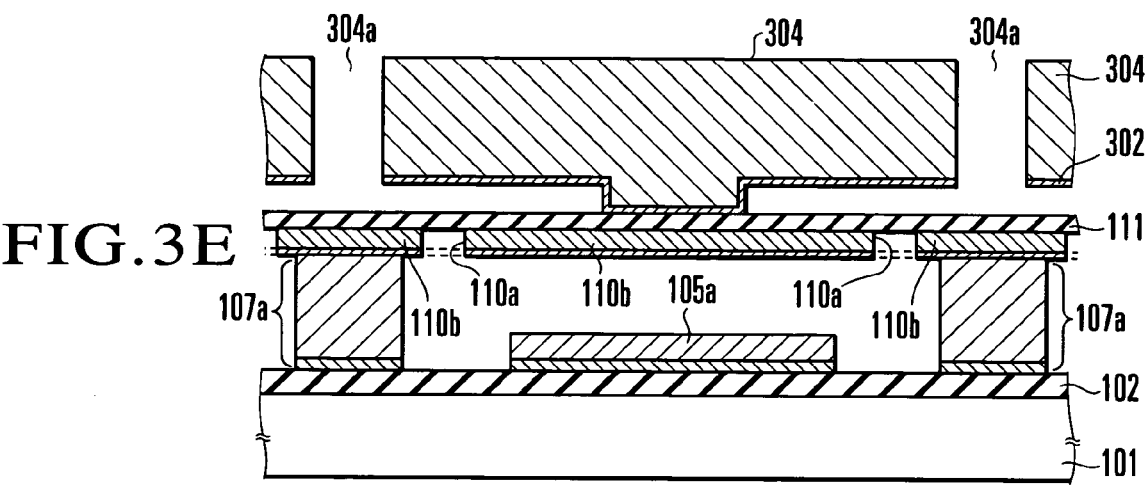

Subsequently, the sacrificial film 301 is etched away via the opening portions 304a. In this etching, an HF-based etchant was used. Consequently, as shown in FIG. 3E, a structure made of the metal pattern 304 and having an upper portion larger than a lower portion is formed.

In this embodiment, a silicon oxide film is used as the second sacrificial film, and an HF-based etchant is used as the etchant for this film, but the present invention is not limited to this embodiment. For example, it is also possible to form the second sacrificial film from titanium, and remove the film by using an HF-based etchant.

Figure 4A:
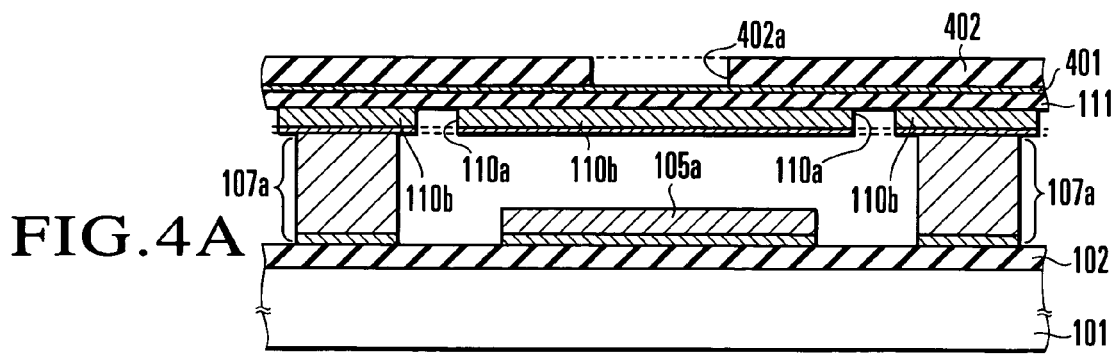

The following method is also possible. A 0.2-µm thick titanium film 401 (etching stop film) is formed on the sealing film 111 by vapor deposition (FIG. 4A). After that, a second sacrificial film 402 made of a resin film is formed by coating, and an opening portion 402a is formed by the well-known photolithography technique. The sacrificial film 402 has positive photosensitivity, and is formed by, e.g., adding a positive photosensitive agent to a base resin (polyimide) such as polyamide, polyamide acid, or polybenzoxazole (or its precursor).

Figure 4B:
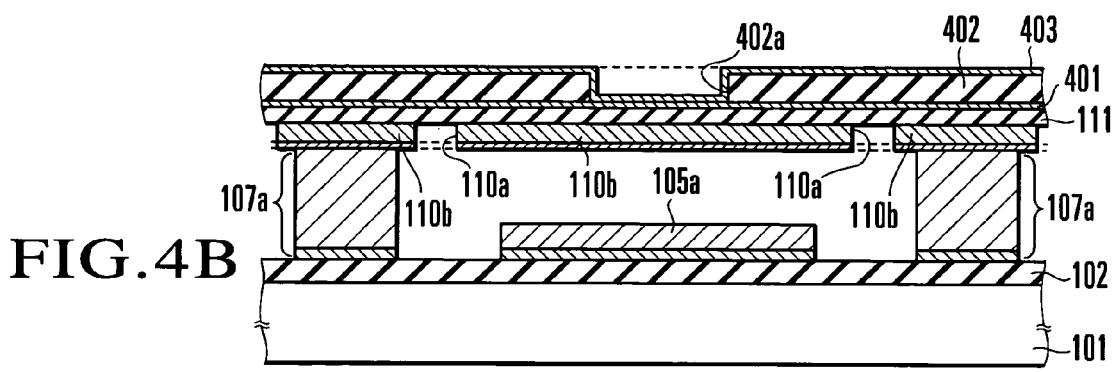
Figure 4C:
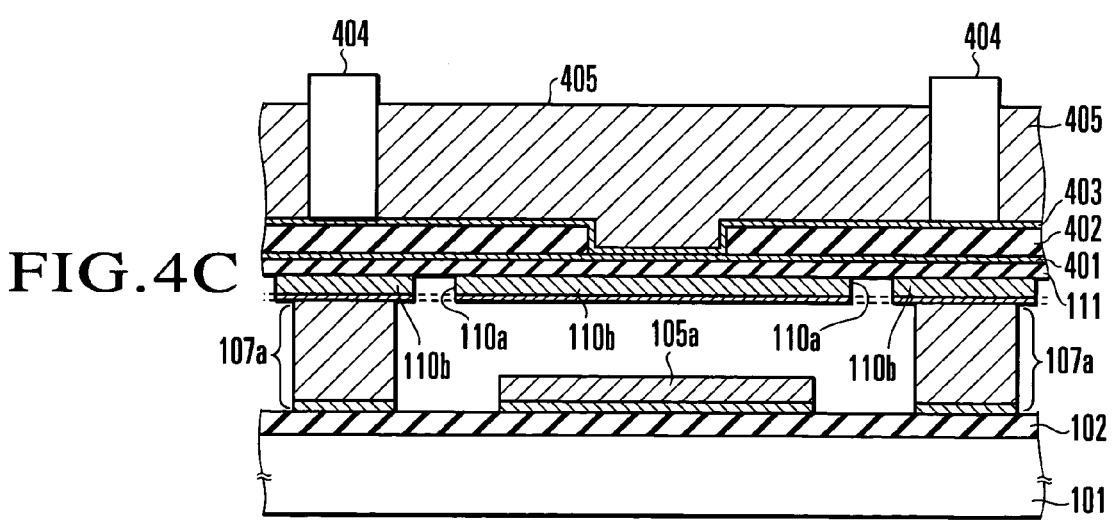

Then, a seed layer 403 (second metal film) made of a two-layered film including a 0.1-µm thick titanium film and 0.1-µm thick gold film is formed by vapor deposition or the like (FIG. 4B). As shown in FIG. 4C, a frame-shaped resist pattern 404 is formed and used as a mask pattern to form a gold plating film about 10 µm thick on the seed layer 403 by electroplating. When the resist pattern 404 is removed after that, as shown in FIG. 4D, a metal pattern 405 (third metal pattern) having opening portions in portions from which the resist pattern 404 is removed is formed.

After that, the metal pattern 405 is used as a mask to selectively etch away the seed layer 403. The substrate 101 is then exposed to a plasma mainly containing oxygen gas, and the etching species generated by the plasma is brought into contact with the sacrificial film 402, thereby removing the sacrificial film 402 (FIG. 4E). In this manner, a metal pattern 405 which is a structure having an upper portion larger than a lower portion is formed.

If necessary, as shown in FIG. 4F, it is also possible to remove a portion of the titanium film 401 on the sealing film 111 or to remove the titanium film as the lower layer of the seed layer 403 by using an HF-based etchant, thereby exposing the surface of the sealing film 111.

Third Embodiment

Another embodiment of the present invention will be described below.

Figure 5A:
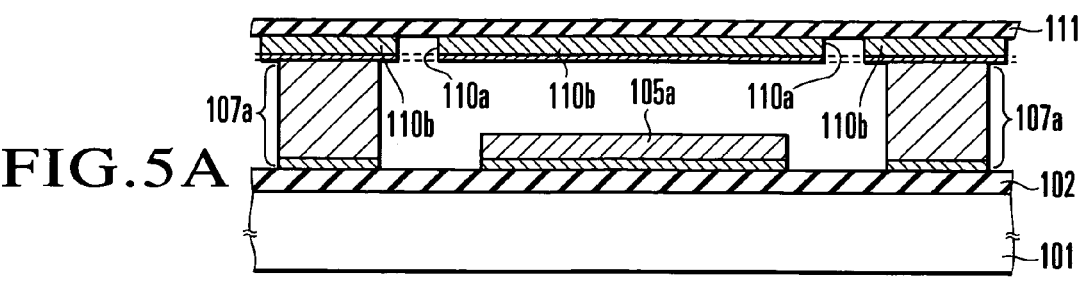
FIGS. 5A to 5D are views of steps for explaining another example of the method of fabricating the surface shape recognition sensor according to the embodiment of the present invention.

First, following the same procedures as in FIGS. 2A to 2J, a lower electrode 105a, upper electrode 110b, and the like are formed, and the upper electrode 110b is covered with a sealing film 111 (FIG. 5A).

Figure 5B:
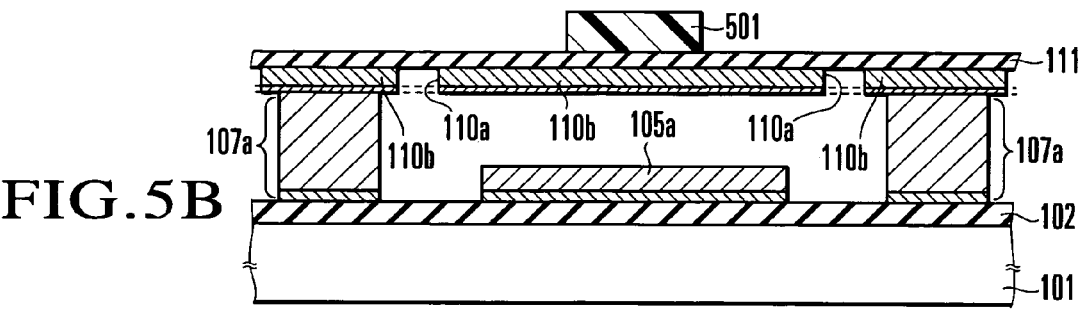

Subsequently, as shown in FIG. 5B, a structure lower portion 501 (columnar pattern) is formed by a resin film on the sealing film 111. The structure lower portion 501 has a substantially square planar shape of about 5 µm side. The resin film has positive photosensitivity, and is formed by, e.g., adding a positive photosensitive agent to a base resin (polyimide) such as polyamide, polyamide acid, or polybenzoxazole (or its precursor).

After this resin film about 5 µm thick is formed on the sealing film 111 by spin coating, as shown in FIG. 5B, the well-known photolithography technique is used to remove the resin film by exposure and development from a region except for a square region of about 5 µm side on a central portion of the upper electrode 110b. After that, the resin film is cured by performing a heat treatment at about 300° C. for 1 hr, thereby forming a structure lower portion 501 made of the resin film.

Figure 5C:
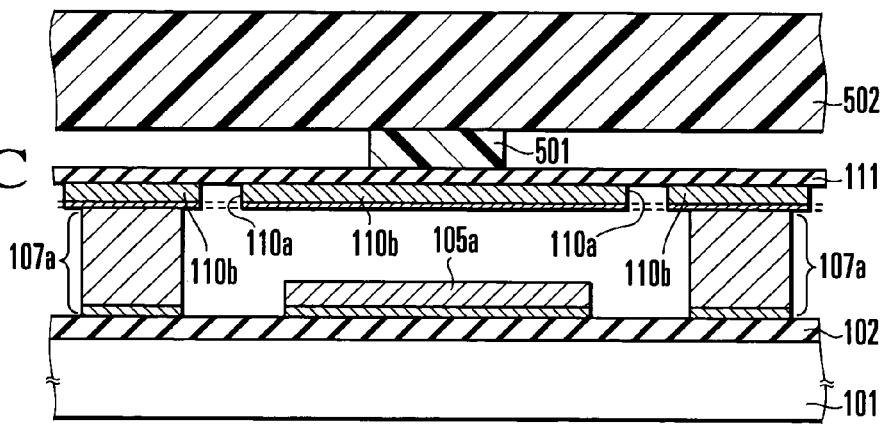

Then, a resin film 502 is laminated by hot-pressing by using the STP technique. The resin film 502 has positive photosensitivity, and is formed by, e.g., adding a positive photosensitive agent to a base resin (polyimide) such as polyamide, polyamide acid, or polybenzoxazole (or its precursor). In this lamination, the resin film formed on a sheet film by coating is hot-pressed and laminated on the structure lower portion 501 such that the resin film comes in contact with the structure lower portion 501 and does not contact the sealing film 111. After that, as shown in FIG. 5C, only the sheet film is peeled off to form a resin film 502.

Figure 5D:
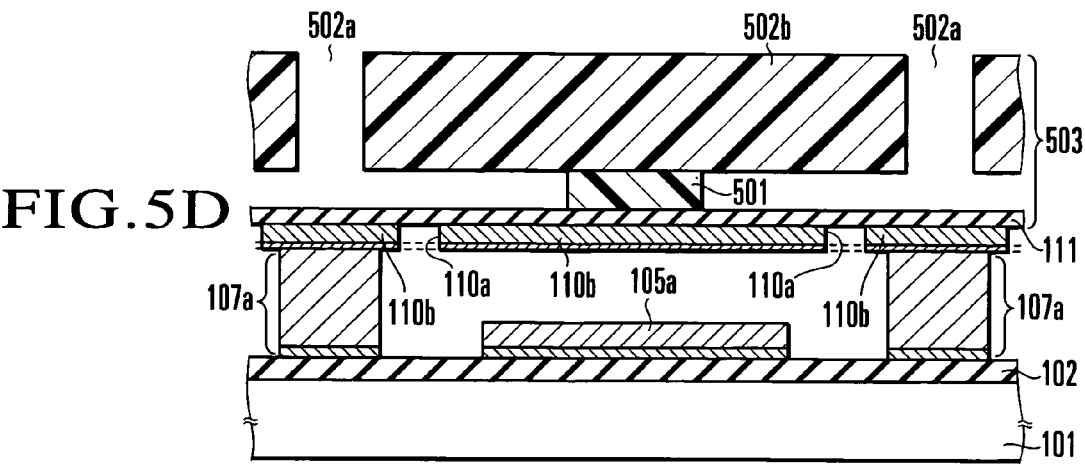

After the resin film 502 is formed as described above, the resin film 502 is patterned using the well-known photolithography technique. In this patterning, the resin film 502 on the upper perimeter of a support member 107a is exposed by a frame-shaped pattern and developed. By this patterning, as shown in FIG. 5D, opening portions 502a and a structure upper portion 502b are formed. After that, the structure upper portion 502b having the opening portions 502a is cured by a heating process which holds the temperature at about 300° C. for 1 hr, thereby forming a structure 503 made up of the structure lower portion 501 and structure upper portion 502b.

In this embodiment explained with reference to FIGS. 5A to 5D, the STP technique is used to form the structure having the upper portion larger than the lower portion. Therefore, this embodiment eliminates the step of forming and etching away a sacrificial film, and makes it possible to reduce the number of steps of fabricating the surface shape recognition sensor.

Figure 6:
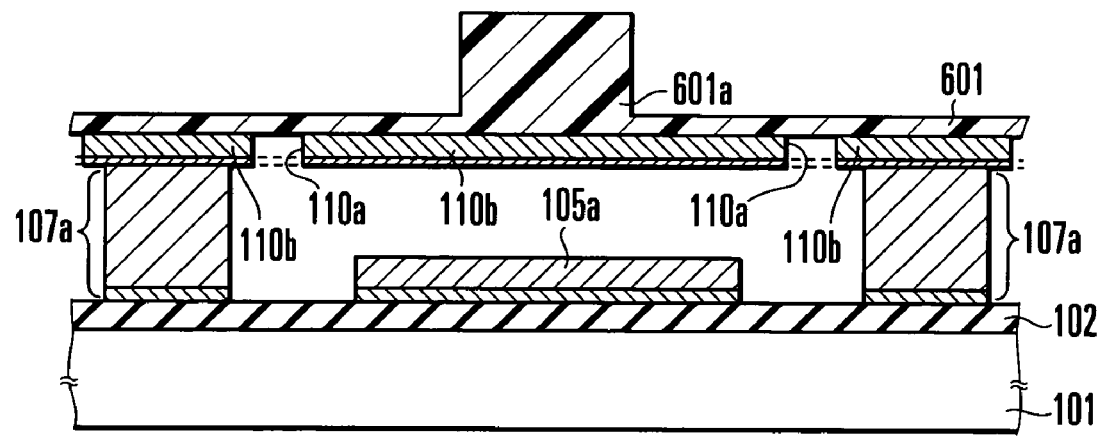
FIG. 6 is a view of a step for explaining another example of the method of fabricating the surface shape recognition sensor according to the embodiment of the present invention.

In this embodiment, as shown in FIG. 5A, a film having a uniform film thickness is used as the sealing film 111, but the present invention is not limited to this embodiment. For example, as shown in FIG. 6, it is also possible to use a sealing film 601 integrated with a projection 601a which corresponds to the structure lower portion.

The sealing film 601 can be formed as follows. First, a 6-μm thick resin film is laminated and adhered to the upper electrode 110b by the STP technique, thereby closing the opening portions 110a. After that, as shown in FIG. 6, a region except for a portion corresponding to the structure lower portion is thinned by exposure and development, thereby forming the sealing film 601 having the projection 601a.

Figure 7:
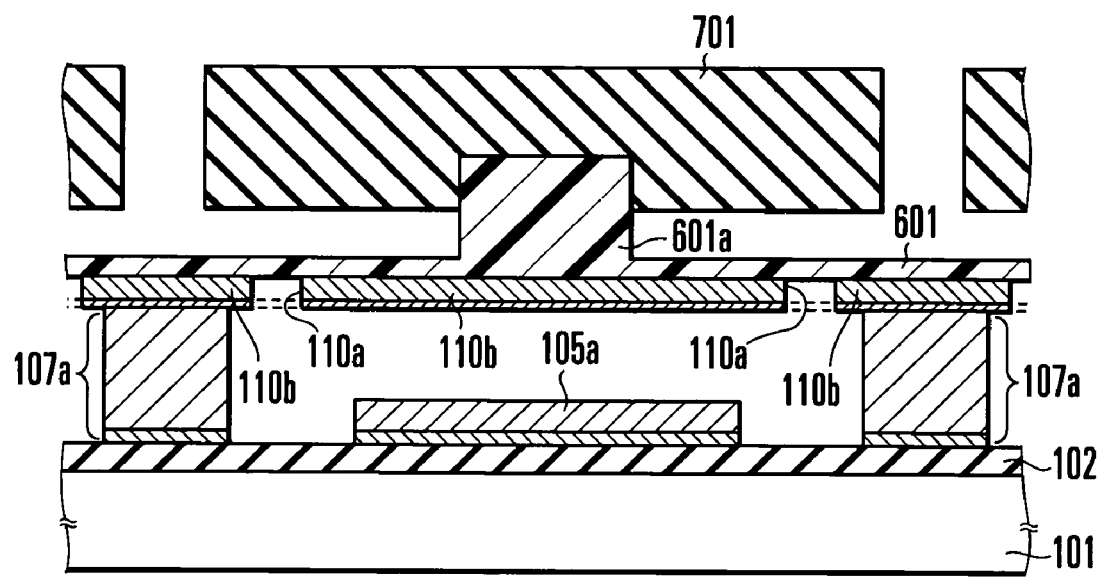
FIG. 7 is a view of a step for explaining another example of the method of fabricating the surface shape recognition sensor according to the embodiment of the present invention.

Although in FIG. 5D the resin film 502 is formed in contact with the upper surface of the structure lower portion 501, the present invention is not limited to this arrangement. For example, as shown in FIG. 7, the upper portion of the projection 601a of the sealing film 601 can also fit in the lower portion of an upper structure 701, provided that the lower surface of the upper structure 701 is not in contact with a region except for the lower structure of the sealing film 601.

Figure 8:
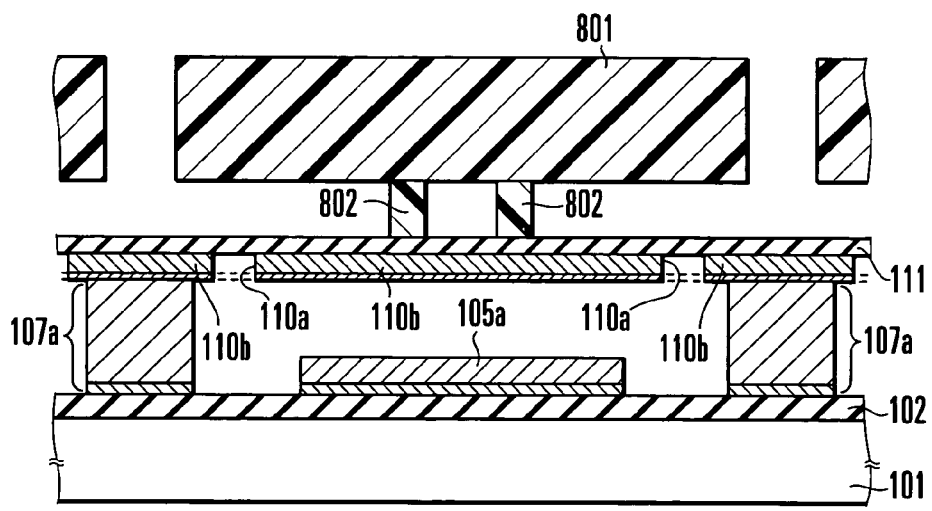
FIG. 8 is a schematic sectional view showing another example of the arrangement of the surface shape recognition sensor according to the embodiment of the present invention.

In the above description, the support portion forming the lower portion of the structure is made up of one member, but the present invention is not limited to this arrangement. For example, as shown in FIG. 8, the support portion of a structure 801 may also be made up of a plurality of columns 802. Note that the rest of the arrangement shown in FIG. 8 is the same as that shown in FIGS. 1A to 1C, so an explanation thereof will be omitted.

Figure 9A:
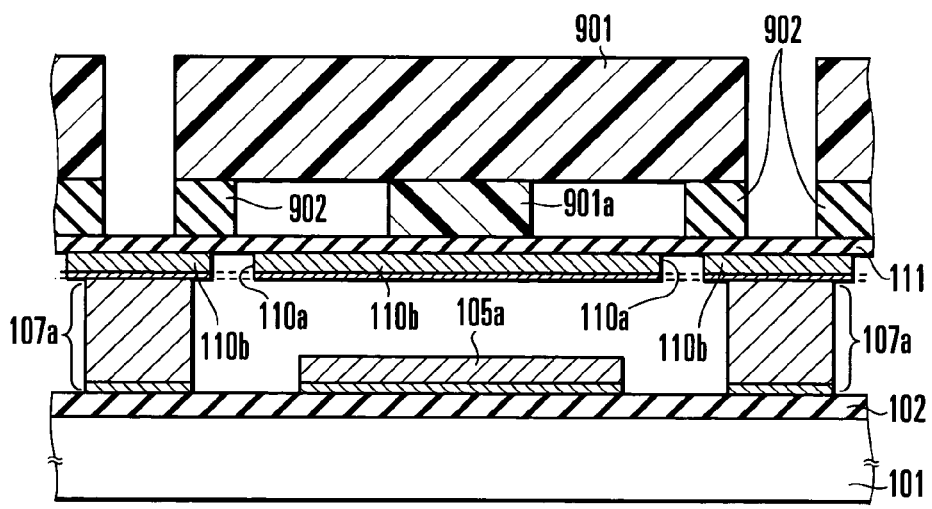
FIG. 9A is a schematic sectional view showing another example of the arrangement of the surface shape recognition sensor according to the embodiment of the present invention.
Figure 9B:
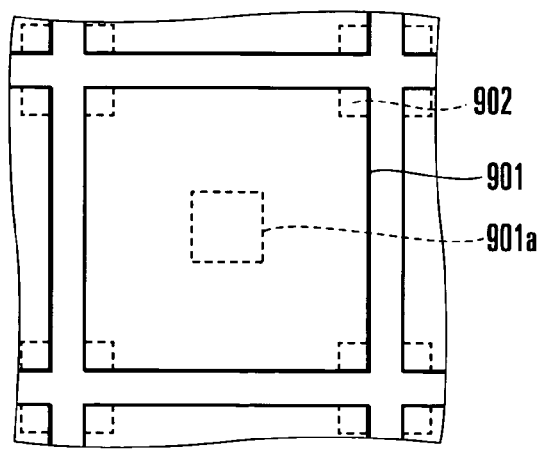
FIG. 9B is a plan view schematically showing an example of the arrangement of a portion of the surface shape recognition sensor according to the embodiment of the present invention.

Also, the overhang as the upper portion of the structure is supported by the support portion formed in substantially the center of the overhang as described above, but the present invention is not limited to this arrangement. As shown in FIGS. 9A and 9B, perimeter support portions 902 made of an elastic material can be formed at the four corners of the overhang having a rectangular planar shape of a structure 901 supported by a support portion 901a formed in substantially the center. The perimeter support portions 902 can be made of, e.g., rubber or coil springs. The perimeter support portions 902 can prevent a fall of the structure 901.

When the structure 901 is pushed down toward the lower electrode 105a, the perimeter support portions 902 made of an elastic material elastically deform and crush, and the sealing film 111 and upper electrode 110b are pushed down by the support portion 901a formed in the center. Even when the perimeter support portions 902 are formed as described above, the transmission of the force to the upper electrode 110b by the structure 901 is not inhibited because the perimeter support portions 902 are made of an elastic material.

An arrangement in which the support portion as the structure lower portion and the overhang as the structure upper portion are made of different materials will be explained below.

Figure 10A:
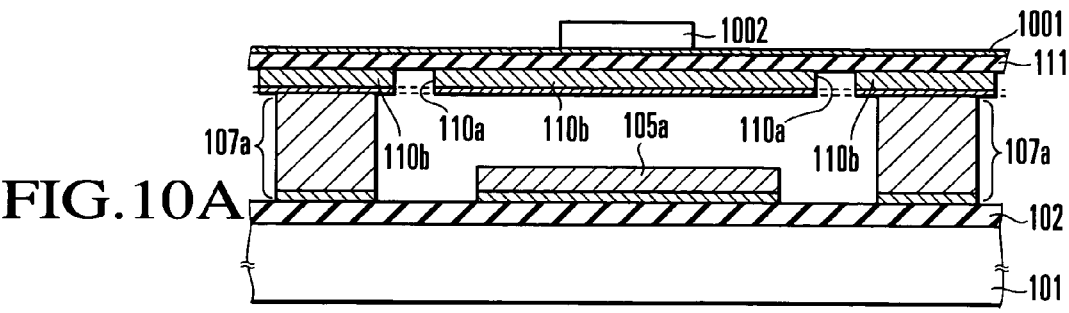
FIGS. 10A to 10I are views of steps for explaining another example of the method of fabricating the surface shape recognition sensor according to the embodiment of the present invention.

First, following the same procedures as in FIGS. 2A to 2J, a lower electrode 105a, upper electrode 110b, and the like are formed, and the upper electrode 110b is covered with a sealing film 111. Subsequently, a seed layer 1001 made of a two-layered film including a 0.1-μm thick titanium film and 0.1-μm thick copper film is formed on the sealing film 111 by vapor deposition, sputtering, or the like, and the well-known photolithography technique is used to form a resist pattern 1002 for each sensor element (FIG. 10A). The resist pattern 1002 is a pattern having a rectangular planar shape formed in a portion as a structure lower portion (to be described below).

Figure 10B:
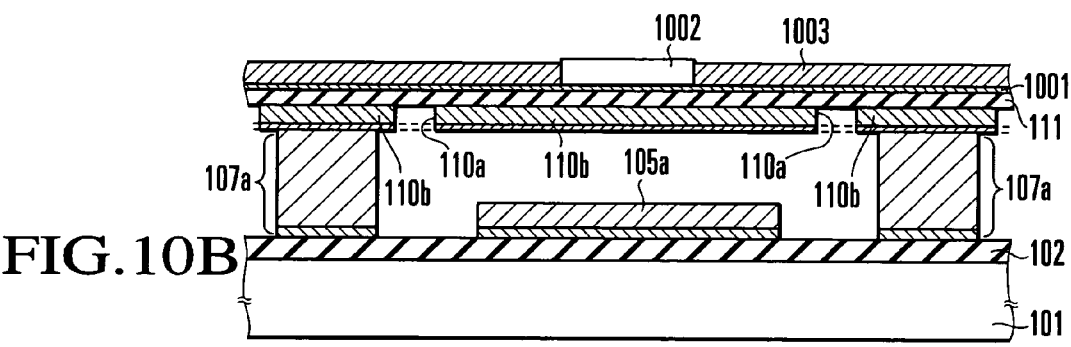

As shown in FIG. 10B, copper is deposited by electroplating on the seed layer 1001 exposed around the resist pattern 1002, thereby forming a copper sacrificial film 1003.

Figure 10C:
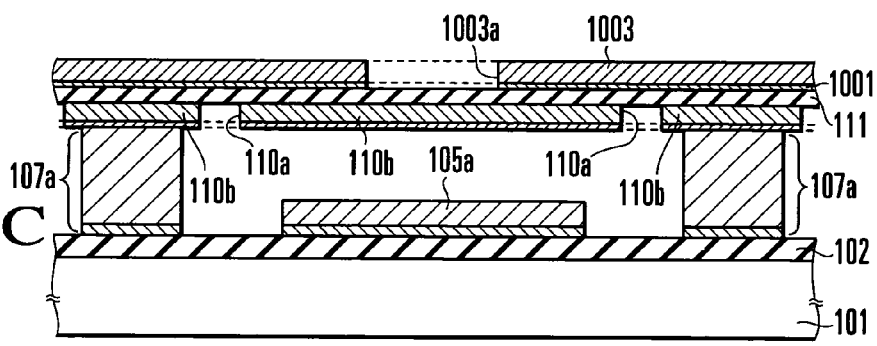

The resist pattern 1002 is then removed, and the sacrificial film 1003 is used as a mask to remove the seed layer 1001 below the resist pattern 1002, thereby exposing the upper surface of the sealing film 111, above the lower electrode 105a, to an opening portion 1003a as shown in FIG. 10C.

Figure 10D:
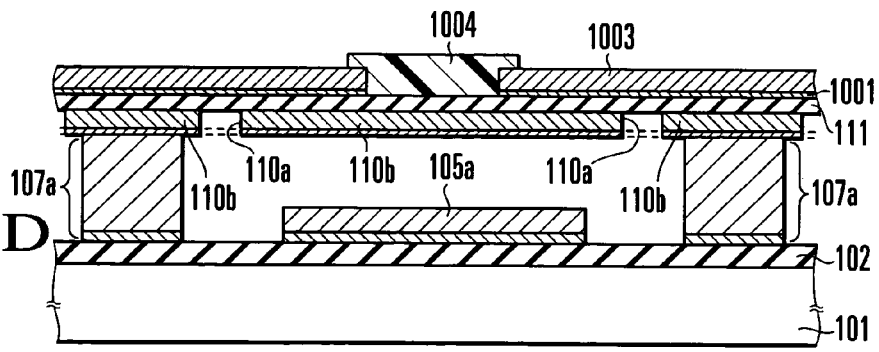

Then, a photosensitive polyimide film is formed on the sacrificial film 103 and patterned by the photolithography technique, thereby forming a structure lower portion 1004 made of polyimide (resin) as shown in FIG. 10D.

Figure 10E:
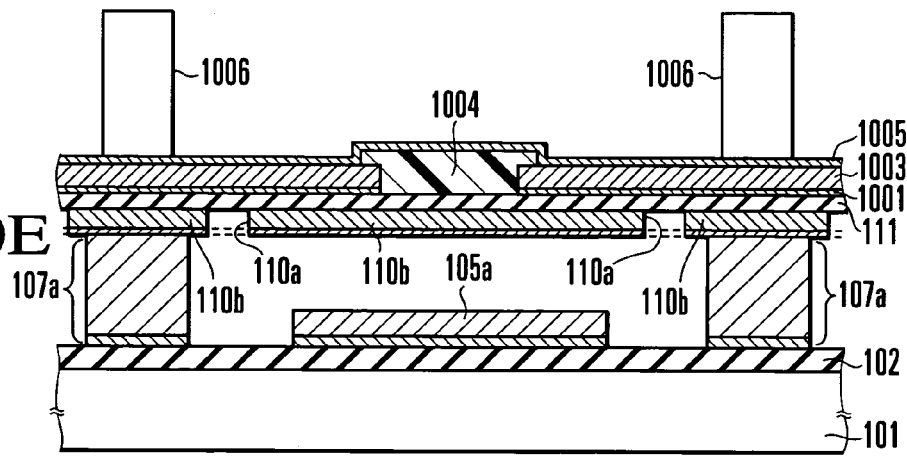

As shown in FIG. 10E, a seed layer 1005 is so formed as to cover the surfaces of the structure lower portion 1004 and sacrificial film 1003, and a resist pattern 1006 is subsequently formed. The seed layer 1005 is a two-layered film including an upper layer made of a 0.1-μm titanium film and a lower layer made of a 0.1-μm thick gold film. Also, the resist pattern 1006 is a lattice-shaped pattern, and formed in a region where a support member 107a is formed.

Figure 10F:
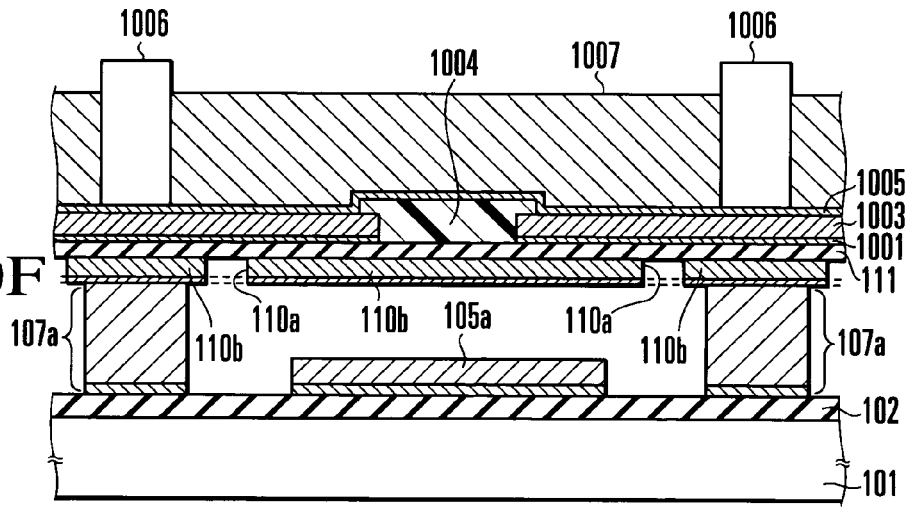

As shown in FIG. 10F, a gold film 1007 about 5 μm thick is formed on the seed layer 1005 so as to fill the squares of the resist pattern 1006 halfway. The gold film 1007 is formed on the exposed seed layer 1005 by plating gold by electroplating.

Figure 10G:
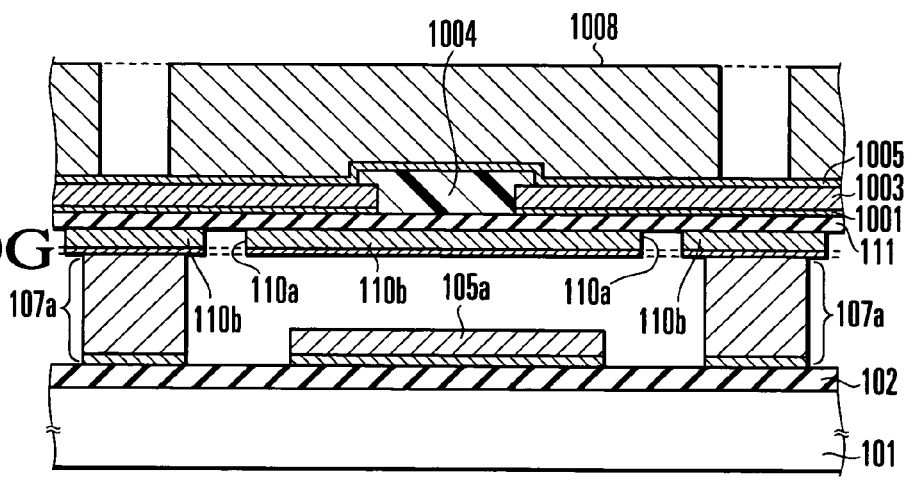

After that, as shown in FIG. 10G, the resist pattern 1006 is removed to form a structure upper portion 1008 made of gold in each sensor element.

Figure 10H:
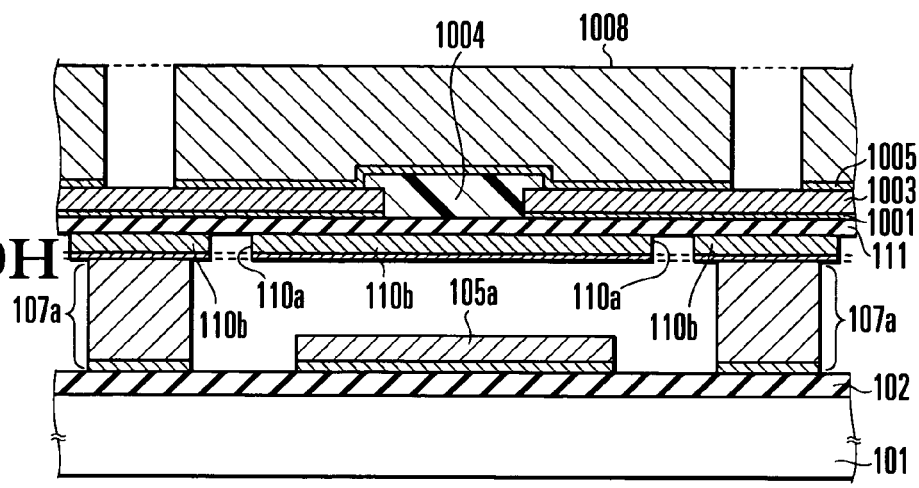

As shown in FIG. 10H, the structure upper portion 1008 is used as a mask to remove the seed layer 1005 by wet etching. For example, the gold as the upper layer of the seed layer 1005 can be etched by using, e.g., an etchant containing iodine, ammonium iodide, water, and ethanol. Also, the titanium as the lower layer of the seed layer 1005 can be etched by using an HF-based etchant. Consequently, the upper surface of the sacrificial film 1003 is exposed around the structure upper portion 1008.

Figure 10I:
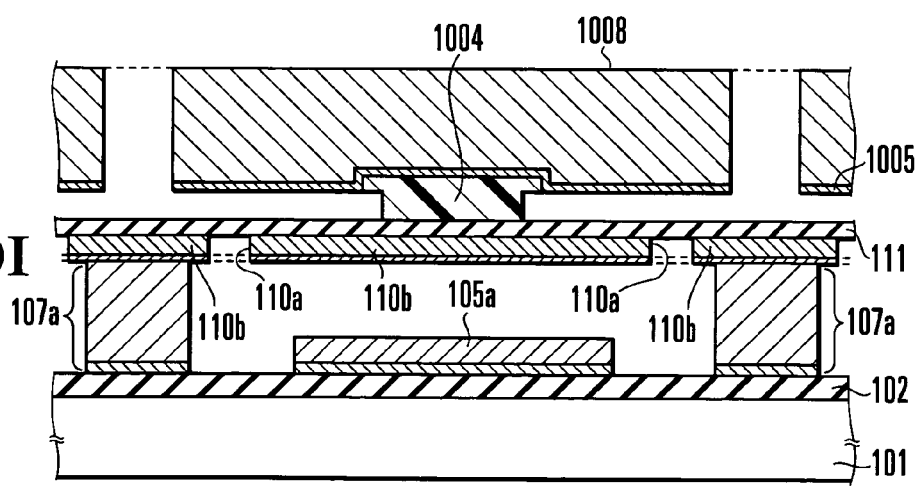

Finally, as shown in FIG. 10I, in the region exposed around the structure upper portion 1008, the sacrificial film 1003 made of copper is etched by an etchant containing nitric acid, and the titanium as the lower layer of the seed layer 1001 is etched by an HF-based etchant, thereby forming a structure made up of the structure lower portion 1004 made of polyimide and the structure upper portion 1008 made of gold. This structure has an overhang as the structure upper portion 1008, and the structure lower portion 1004 which supports substantially the center of the structure upper portion 1008. The structure is formed in the position of the lower electrode 105a in each sensor chip.

In the surface shape recognition sensor shown in FIG. 10I, the overhang of the structure formed on the upper electrode 110b is made of a metal. Therefore, the overhang is a rigid body having a high Young's modulus, does not easily deform, and hardly interferes with deformation of the upper electrode when a fingerprint shape is sensed. Also, when compared to a case in which the overhang is made of a synthetic resin, the rigidity can be ensured even if the thickness is decreased, so the surface shape recognition sensor shown in FIG. 10I can be fabricated within a shorter time period.

Another example of the arrangement in which the support portion as the structure lower portion and the overhang as the structure upper portion are made of different materials will be explained below.

Figure 11A:
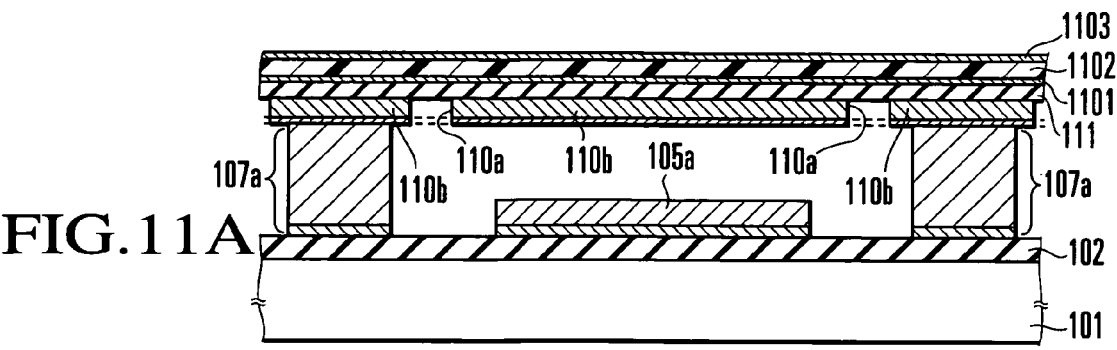

Following the same procedures as in FIGS. 2A to 2J, a lower electrode 105a, upper electrode 110b, and the like are formed, and the upper electrode 110b is covered with a sealing film 111. Subsequently, a 0.1-μm thick adhesive layer 1101 made of titanium is formed on the sealing film 111 by, e.g., vapor deposition or sputtering, a polyimide layer 1102 is formed on the adhesive layer 1101, and a seed layer 1103 is formed on the polyimide layer 1102 (FIG. 11A). The polyimide layer 1102 can be formed by spin coating and thermal cure of a polyimide resin. Also, the seed layer 1103 is a two-layered film including a lower layer made of a 0.1-μm thick titanium film, and an upper layer made of a 0.1-μm thick gold film. In the seed layer 1103, the titanium lower layer improves the adhesion to the polyimide layer 1102.

Figure 11B:
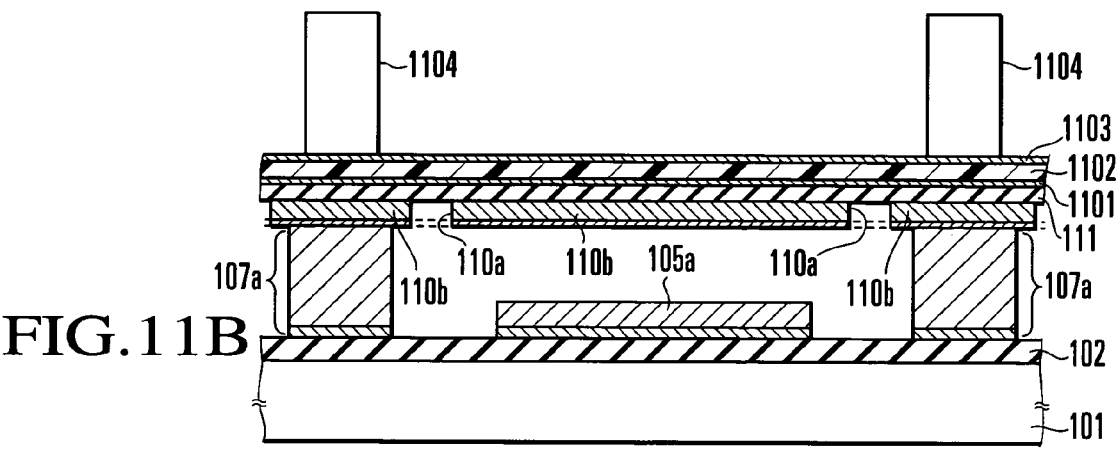
Figure 11C:
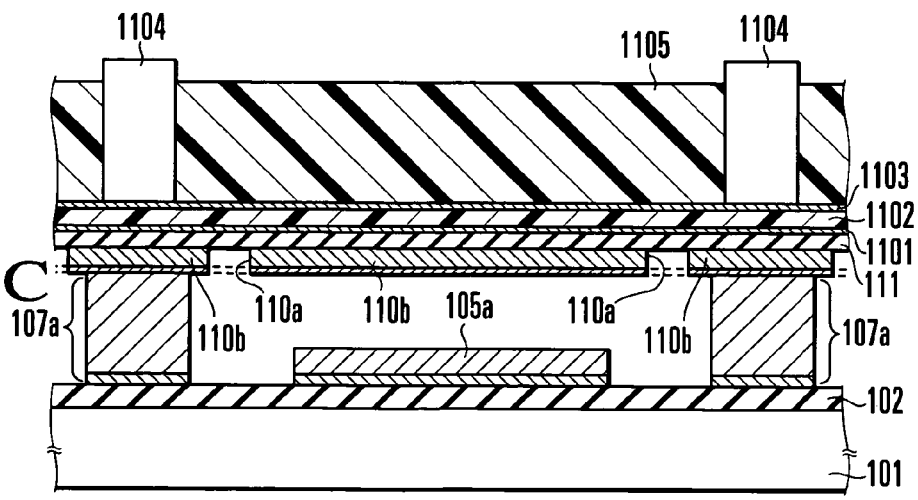

Subsequently, as shown in FIG. 11B, a resist pattern 1104 is formed on the seed layer 1103 by the well-known photolithography technique. The resist pattern 1104 is a lattice-shaped pattern, and formed in a region where a support member 107a is formed.

As shown in FIG. 1C, a gold film 1105 about 5 μm thick is formed on the seed layer 1103 so as to fill the square of the resist pattern 1104 halfway. The 5-μm thick gold film 1105 is formed on the exposed seed layer 1103 by plating gold by electroplating.

After that, as shown in FIG. 1D, the resist pattern 1104 is removed to form a structure upper portion 1106 made of gold in each sensor element. Also, the seed layer 1103 is removed by wet etching by using the structure upper portion 1106 as a mask. For example, the gold as the upper layer of the seed layer 1103 can be etched by using an etchant containing iodine, ammonium iodide, water, and ethanol. Also, the titanium as the lower layer of the seed layer 1103 can be etched by using an HF-based etchant. Consequently, the upper surface of the polyimide layer 1102 is exposed around the structure upper portion 1106.

Finally, as shown in FIG. 1E, in the region exposed around the structure upper portion 1106, a predetermined amount of the polyimide layer 1102 is etched by dry etching using oxygen plasma, thereby forming a structure lower portion 1107 made of polyimide. In this state, the lower surface of the structure lower portion 1107 is connected and fixed on the sealing film 111 via the adhesive layer 1101, and the upper surface of the structure lower portion 1107 is connected and fixed to the structure upper portion 1106 via the seed layer 1103.

Note that as shown in FIG. 11F, it is also possible to remove portions other than the adhesive layer 1101 and seed layer 1103 in contact with the structure lower portion 1107 by wet etching.

In the present invention as has been explained above, a structure which is made up of an overhang and a support portion supporting substantially the center of the overhang, and in which the area of the support portion is smaller than the area of the overhang in the two-dimensional direction of an upper electrode is formed on the upper electrode in a region above each lower electrode. In a surface shape recognition sensor having this arrangement, an object of surface shape sensing, e.g., a fingertip touches the surface of the overhang of the structure, and the support portion of this structure whose overhang is in contact with the object of sensing pushes down a portion of the upper electrode toward the lower electrode, thereby deforming the upper electrode.

This structure can efficiently transmit the force received from the finger to the upper electrode, increase the deflection of the upper electrode, and thereby increase the sensing sensitivity of this sensor.

Figure 12:
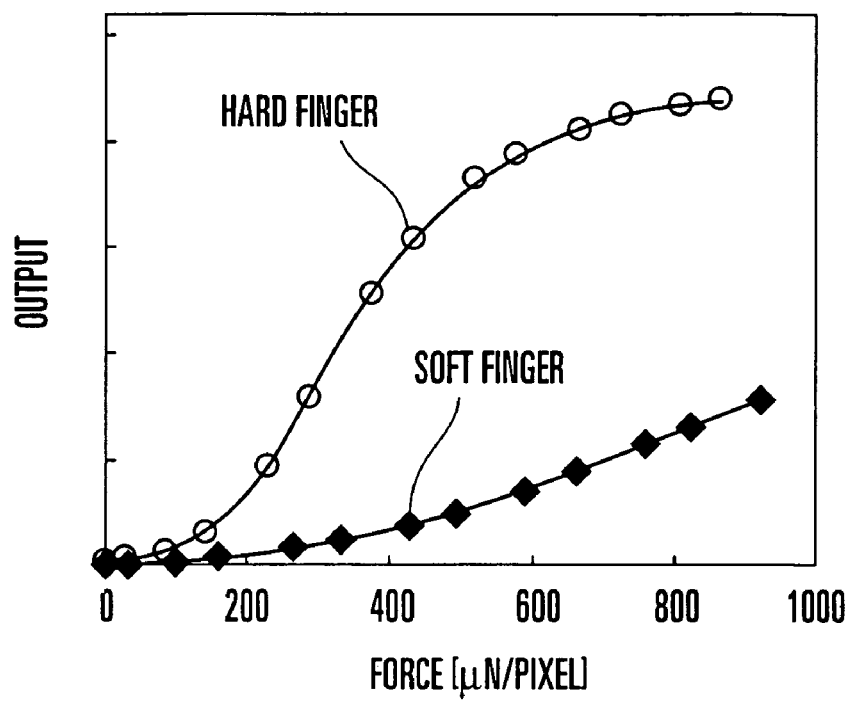
FIG. 12 is a graph for explaining the state of sensing by a conventional surface shape recognition sensor.
Figure 13:
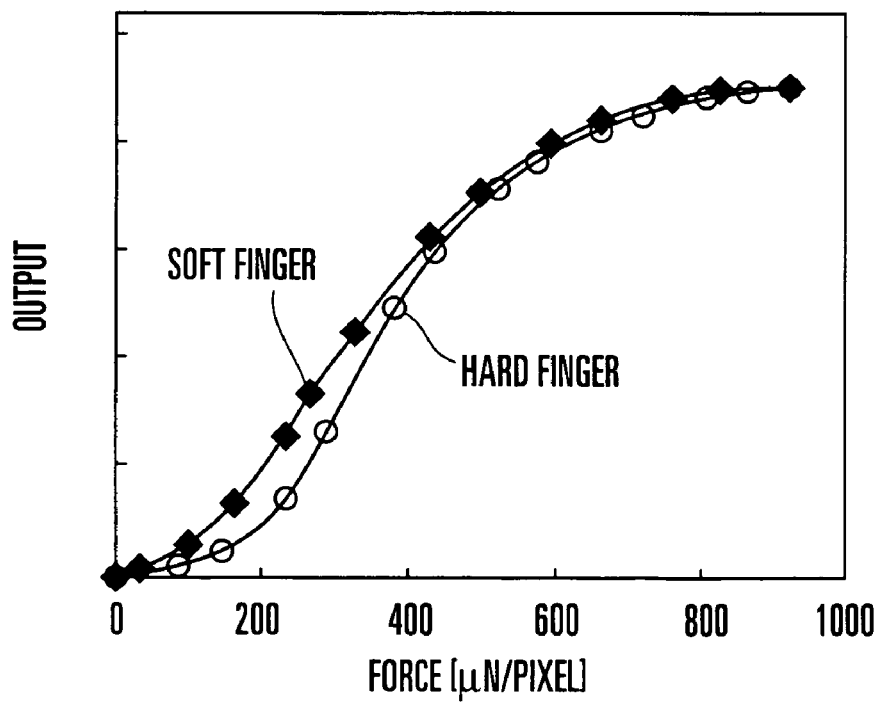
FIG. 13 is a graph for explaining the state of sensing by the surface shape recognition sensor according to the embodiment of the present invention.
Figure 14:
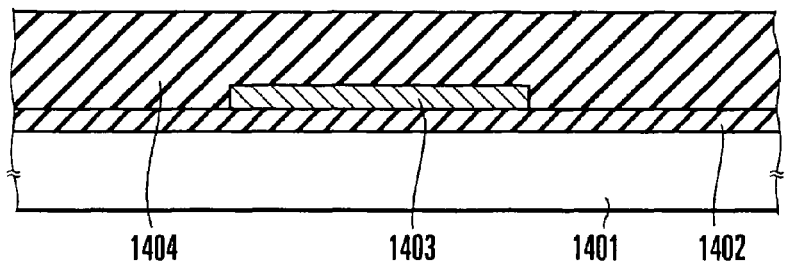
FIG. 14 is a schematic sectional view showing an example of the arrangement of a conventional surface shape recognition sensor.
Figure 15:
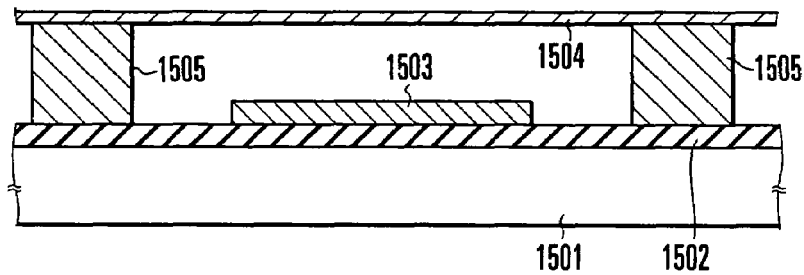
FIG. 15 is a schematic sectional view showing an example of the arrangement of a conventional surface shape recognition sensor.
Figure 16:
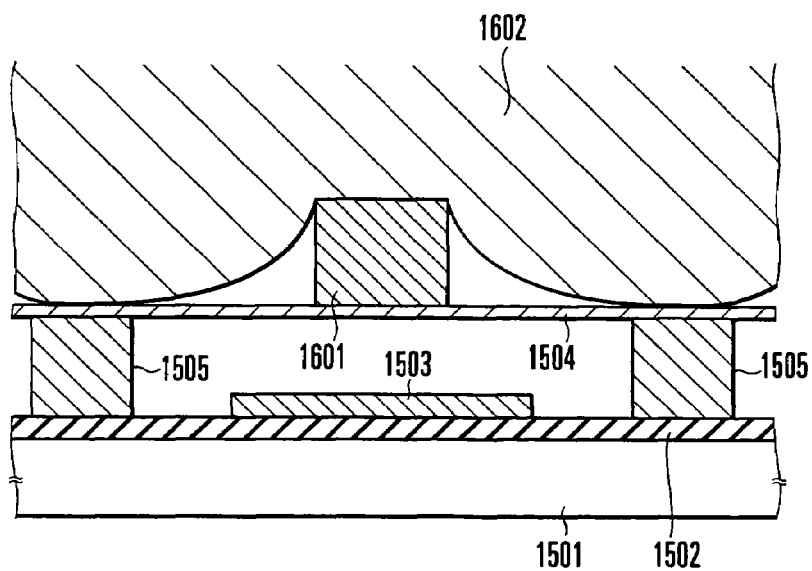
FIG. 16 is a schematic sectional view showing an example of the arrangement of a conventional surface shape recognition sensor.

For example, as shown in FIG. 12, in the conventional structure having no overhang, if the surface of a finger as an object of fingerprint sensing is soft, the output from the sensor does not largely increase even when the force of pushing the finger increases. By contrast, in the arrangement of the present invention having the overhang, even if the surface of a finger is soft, the sensor output equivalent to that obtained by a hard finger can be obtained by increasing the force which pushes the fingertip.

Also, in the arrangement of the present invention, the spacing between adjacent structures is narrow, and the upper surface of each structure is a substantially flat surface, so a remarkable effect is obtained by which the sensor does not easily break even if a force is applied sideways by an object of sensing such as a finger, i.e., by which the high mechanical strength is high.

As described above, the surface shape recognition sensor according to the present invention is suited to sensing fingerprints at high accuracy.

The invention claimed is:

1. A surface shape recognition sensor characterized by comprising:
    a plurality of capacitance sensing elements comprising a plurality of lower electrodes arranged in the same plane on a substrate so as to be insulated and separated from each other, and a deformable plate-shaped upper electrode formed above said lower electrodes with a predetermined spacing therebetween, and made of a metal;
    a support member which is formed around said lower electrode so as to be insulated and separated from said lower electrode, and supports said upper electrode; and
    a structure formed on said upper electrode in a region above each of said lower electrodes in one-to-one correspondence with said lower electrode,
    wherein said structure comprises an overhang and a support portion which supports substantially a center of said overhang, and
    an area of said support portion is smaller than an area of said overhang in a two-dimensional direction of said upper electrode.

2. A surface shape recognition sensor according to claim 1, characterized by further comprising a thin flexible film formed on said overhang of said structure, and extending over a plurality of said structures.

3. A surface shape recognition sensor according to claim 1, characterized by further comprising a perimeter support portion formed below a perimeter of said overhang, and made of an elastic material.

4. A surface shape recognition sensor according to claim 1, characterized in that said substrate is a semiconductor substrate on which an integrated circuit is formed, said lower electrode is placed on a interlevel dielectric formed on said semiconductor substrate, and said integrated circuit includes a sensing circuit which senses a capacitance formed on said lower electrode.

* * * * *